(12) United States Patent
Leong et al.

(10) Patent No.: US 6,393,475 B1
(45) Date of Patent: *May 21, 2002

(54) METHOD OF PERFORMING A NETWORK MANAGEMENT TRANSACTION USING A WEB-CAPABLE AGENT

(75) Inventors: Leon Y. K. Leong, Palo Alto; Duc H. Doan, Santa Clara, both of CA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,824

(22) Filed: Sep. 24, 1999

Related U.S. Application Data

(63) Continuation of application No. 08/901,198, filed on Jul. 28, 1997, now Pat. No. 5,996,010.

(51) Int. Cl.[7] ............................................. G06F 15/173
(52) U.S. Cl. ........................ 709/223; 709/224; 709/225
(58) Field of Search ................................ 709/223, 224, 709/225, 203, 226

(56) References Cited

U.S. PATENT DOCUMENTS

| | | | | |
|---|---|---|---|---|
| 5,634,062 A | * | 5/1997 | Shimizu et al. | 395/762 |
| 5,706,502 A | * | 1/1998 | Foley et al. | 395/610 |
| 5,737,592 A | * | 4/1998 | Nguyen et al. | 395/604 |
| 5,742,762 A | * | 4/1998 | Scholl et al. | 709/203 |
| 5,751,956 A | * | 5/1998 | Kirsch | 709/203 |
| 5,778,178 A | * | 7/1998 | Arunachalam | 709/203 |
| 6,061,721 A | * | 5/2000 | Ismael et al. | 709/223 |

OTHER PUBLICATIONS

Salvatore Salamone, Browsers To Monitor Networks. *LAN TIMES*, vol. 13, issue 17, Aug. 5, 1996; 2 pgs.
Claudia Graziano, Rainy Day on the Horizon. *LAN TIMES Online*, Aug. 5, 1996; 1 pg.
Monica Snell, Intranet–based Management Consoles Already Under Way. *LAN TIMES Online*, Aug. 5, 1996; 2 pgs.
Salvatore Salamone, Microsoft, Intel, others back protocol for Web–enabled enterprise management. *LAN TIMES Online*, Aug. 5, 1996; 2 pgs.
Monica Snell, Web Tangles Management. *LAN TIMES Online*, Aug. 19, 1996; 2 pgs.
Berners–Lee, T. and Connolly, D. Hypertext Markup Language: A Representation of Textual Information and Metainformation for Retrieval and Interchange. Jun. 1993; 36 pages.
Tim Berners–Lee. Hypertext Transfer Protocol: A Stateless Search, Retrieve and Manipulation Protocol. Nov. 5, 1993; 25 pages.

* cited by examiner

*Primary Examiner*—Zarni Maung
(74) *Attorney, Agent, or Firm*—Blakely Sokoloff Taylor & Safman LLP

(57) ABSTRACT

A method of performing a network management transaction between a network device, having a network management agent installed thereon, and a remote device, having a web-browser installed thereon, is described. The method involves firstly performing a network management function relating to the network device. Data concerning the network management function is then propagated from the agent to the remote device in a format capable of display by the browser. More specifically, a document is propagated from the agent to the remote device for display by the browser, the document incorporating the data concerning the network management function. The document may be an HTML document. Alternatively, the data may be propagated in a format for display by the browser under the direction of an application program resident of the remote device.

20 Claims, 17 Drawing Sheets

METHOD OF PERFORMING A NETWORK MANAGEMENT TRANSACTION USING A WEB-CAPABLE AGENT

CROSS-REFERENCE TO RELATED APPLICATIONS

This application is a continuation of application Ser. No. 08/901,198, filed Jul. 28, 1997, now U.S. Pat. No. 5,996,010.

FIELD OF THE INVENTION

The present invention pertains to the field of network management. More particularly, the present invention relates to a protocol for performing network management using a web-capable network management agent.

BACKGROUND OF THE INVENTION

The proliferation of both local area networks (LANs) and wide area network (WANs) has resulted in increasing demands being made on network management tools and on network management personnel. In order to increase the ease and speed with which network management personnel are able to perform management tasks and respond to network problems, it is desirable to provide such personnel with convenient and ready access to network management tools.

The Internet, and more specifically the World Wide Web (hereinafter referred to as "the web") component thereof, have become increasingly accepted as a medium of data communication in recent years. Programs which allow documents and objects to be retrieved from the web, and to be viewed are generically termed "web browsers". Hypertext Markup Language (HTML) is the language used for the construction of documents that are viewable by web browsers, and a specification of this language is provided in the Request For Comments (RFC) document by Berners-Lee, T., D. Connolly, "Hypertext Markup Lanugue—2.0", RFC 1866, MIT Laboratory of Computer Science, November 1995. A large number of browsers are commercially available, including the Netscape Navigator® browser developed by Netscape Communications of Mountain View, Calif., and the Microsoft Internet Explorer® browser developed by Microsoft Corporation of Redmond, Wash.

While browsers operate to display HTML documents, they are also responsible for negotiating a HyperText Transport Protocol (HTTP) with a web server prior to the retrieval of an HTML document or other object, the submission of information from the browser to a web server, and responding to requests to "link" to (or retrieve) other HTML documents identified in an HTML document currently displayed by the browser. The capabilities of web browsers and servers are further continually being enhanced by the development of so-called "plug-ins", which are software modules which can be added to web browser and server software to provide enhanced functionality.

In view of the popularity and proliferation of the web browsers there has been some development towards allowing network managers to perform network management functions utilizing a web browser over the internet or an intranet. Referring to FIGS. 1A and 1B, two arrangements for facilitating management of a network 10, utilizing a web browser, are illustrated. The network segment 10 comprises a network management station 12 and a network device 14, which may be a host, gateway, terminal server, hub, repeater, bridge or frame switch. A network management application 16 resides on the network management station 12, while a network management agent 18 resides on the network device 14. The application 16 and the agent 18 communicate management information using the Simple Network Management Protocol (SNMP), as defined in the RFC by Case, J. M. Fendor, M. Schoffstal, and J. Davin, "The Simple Network Management Protocol", RFC 1157 University of Tennessee at Knoxville, Performance Systems International, Performance Systems International, and the MIT Laboratory of Computer Science, May 1990. More specifically, the agent 18 will provide the application 16 with status information regarding network activity relating to the network device 14, either when polled by the application 16, or as a trap. The application 16 assimilates network status information from a number of network management agents to provide a network manager with an overall view of network activity and status. A network manager can perform network management functions by receiving messages from and sending messages to the agent 18.

All network management functions with an SNMP environment are performed by altering and inspecting variables or "managed objects". These managed objects are termed Management Information Base (MIB) objects, and each network management agent 18 supports a predetermined set of MIB objects (termed an SNMP MIB view of that agent). The sets of MIB objects supported by various network management agents may vary from network device to network device. A number of MIB objects are defined in the RFC by McCloghrie, K., and M. Rose, "Management Information Base for Network Management of TCP/IP-based Internets", RFC 1156 Hughes LAN Systems and Performance Systems International, May 1990. Examples of such managed objects includes the "sysUpTime" object (which provides a value indicating the time since the network management portion of a system was last re-initialized) and the "ifAdminStatus" object (which indicates whether an interface is up, down or in a testing state).

In order to maintain the simplicity of the SNMP, the exchange of messages using the SNMP utilizes an unreliable datagram service, such as the User Datagram Protocol (UDP) as specified in the RFC by Poster, J., "User Datagram Protocol", RFC 768, USC/Information Sciences Institute, November 1980. The UDP protocol allows the transmission of message packets in a serial fashion, and accordingly has a limited bandwidth.

Also shown is FIG. 1A is a remote device 20, such a desktop computer, on which is resident a client 22 in the form of a web browser. The client 22 communicates with a proxy agent 24, which is resident on the network management station 12 using the Hypertext Transfer Protocol (HTTP), as defined in the RFC by Fielding, R., H. Frystyk, T. Berners-Lee, J. Gettys, J. C. Mogul, "Hypertext Transfer Protocol—HTTP/1.1", RFC xxxx UC Irvine, MIT Laboratory of Computer Science, MIT Laboratory of Computer Science, DEC, DEC, April 1996. Accordingly, all data packages passed between the client 22 and the proxy engine 24 conform to the HTTP protocol. The proxy agent 24 receives and translates data packages from the client 22 into a format understood by the network management application 16, before propagating the translated message to the application 16. Accordingly, the proxy agent 24 is an intermediate program which acts as both a server and a client for the purposes of translating and forwarding requests to the application 16 on behalf of the client 22. Similarly, messages intended for transmission from the application 16 to the client 22 must firstly be propagated to the proxy agent 24, which translates the message into a format required by the HTTP protocol. After performing the translation, the proxy agent 24 then propagates the message to the client 22.

FIG. 1B shows the network management station 12 and the network device 14 which communicate network management information according to the SNMP protocol, as described above. However, the proxy agent 24 is now shown to reside on the network device 14, instead of the network management station 12. In the shown arrangement, the client 22 installed on the remote device 20 communicates with the network management agent 18 via the proxy agent 24 as described above. In this case, the proxy agent 24 translates a message received from the client 22 from a format specified by the HTTP protocol to a format specified by the SNMP format. Similarly, a message from the network management agent 18 to the client 22 is translated by the proxy agent 24 from a format specified by the SNMP protocol to a format specified by the HTTP protocol.

While the arrangements shown in FIGS. 1A and 1B allow a degree of network management to be performed from a client 22 resident on a remote device, there are a number of limitations inherent in these arrangements. Specifically, the HTTP protocol is primarily intended to facilitate the retrieval of static documents by a client from a server. The SNMP protocol is intended to facilitate network management in a simple and effective manner. Furthermore, the existence of a proxy agent for the translation of messages between the two protocols is inefficient and undesirable.

SUMMARY OF THE INVENTION

The present invention contemplates a network management protocol wherein a method token, associated with a network management function, is incorporated or embedded directly into a Uniform Resource Locator (URL) or Uniform Resource Identifier (URI) propagated from a browser. Data generated by the performance of the network management function is then communicated by a network management agent to a browser in a format that can be displayed by the browser.

According to the invention there is provided a method of performing a network management transaction between a network device having a network management agent installed thereon and a remote device having a browser installed thereon. The method involves firstly performing a network management function relating to the network device. Data concerning the network management function is then propagated from the agent to the remote device in a format capable of display by the browser. More specifically, a HTML document is composed by the agent and then propagated from the agent to the remote device for display by the browser, the document incorporating the data concerning the network management function. Alternatively, the data may be propagated in a format for display by the browser under the direction of an application program resident of the remote device.

The network management function relating to the network device is performed in response to a network management request issued from the browser. The network management request may be included in a data packet received at the agent, the data packet including a plurality of network management requests. The network management function addresses a network management object, and performing the network management function requires that an object identifier included within the network management request be associated with the network management object.

Prior to a network management request being issued from the browser, a list of network management functions supported by the agent is sent from the agent to the remote device. The agent may also transmit a menu HTML document to the remote device for display by the browser, the menu document providing an option to issue the request from the browser to the agent. The menu HTML document includes static information concerning the network device, and includes a number of URIs (or URLs) including embedded method tokens for initiating network management functions.

A network management function may involve the retrieval of network management information, the allocation of a value of a network management object, or the setting of a trap on a network management object.

A connection is established between the agent and the browser, and the connection is maintained for multiple network management transactions between the agent and the remote device.

The invention extends to a computer-readable medium having a plurality of instructions thereon which, when executed by a processor within the network device, cause the processor to perform the steps detailed above.

The invention also extends to a network device having a processor and a memory coupled to the processor, the memory storing a set of instructions which, when executed by the processor, cause the processor to perform the steps detailed above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method of performing a network management transaction using a web-capable agent is described. In the following description, for purposes of explanation, numerous specific details are set forth in order to provide a thorough understanding of the present invention. It will be evident, however, to one skilled in the art that the present invention may be practiced without these specific details.

1. Terminology

The terms specified below are used throughout the specification, and are intended to have the import, and encompass the concepts, as stated below:

1.) Uniform Resource Identifier (URI): URI's are data strings intended to identify, via name, location or any other characteristic, a network resource. The term URI is intended to encompass a number of terms common in the art, namely a Uniform Resource Locator (URL), a Uniform Resource Name (URN), a world wide web address, and an Universal Document Identifier (UDI).

2.) Resource: Any network data object, variable or service.

3.) Client: A program which, inter alia, establishes a connection with a server for the purposes of sending or receiving data.

2. Overview of the Invention

Figure 1A:
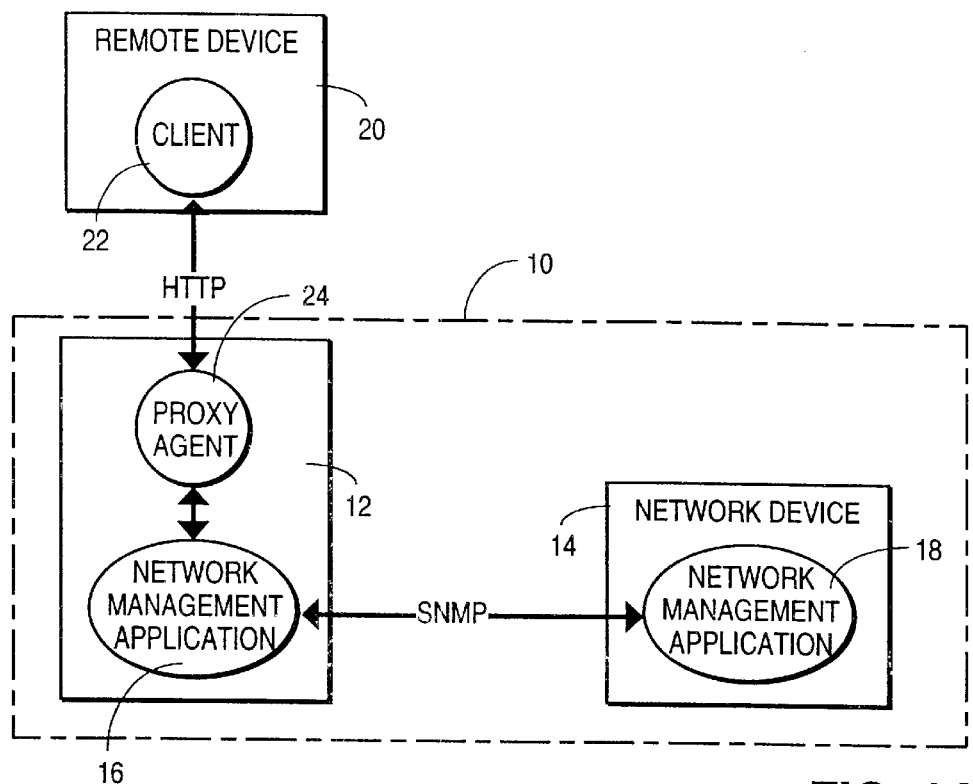
FIGS. 1A and 1B are schematic representations of arrangements for managing a network from a remote device having a web-browser installed thereon.
Figure 1B:
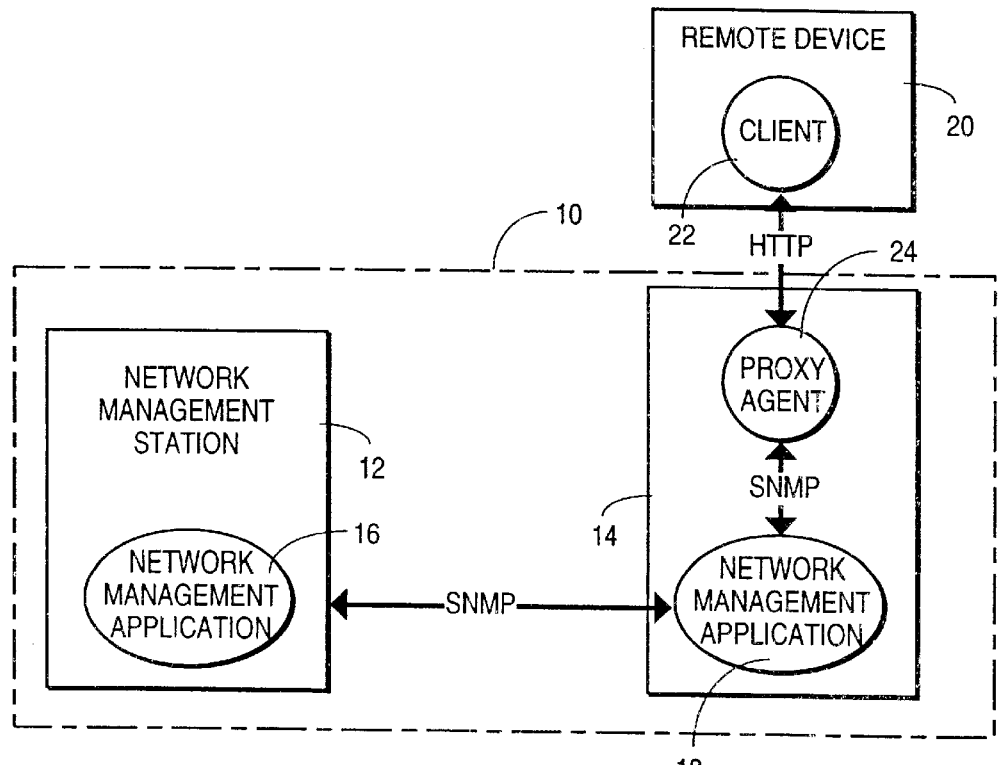

The present invention seeks to address the limitations of the arrangements presented in FIGS. 1A and 1B by providing a web-capable program (which may be either a network management application or a network management agent) which will support a number of network management functions, and will have the capability of propagating information regarding such network management functions in a format that is capable of display on a web browser. Accordingly, a web-capable network management agent proposed by the present invention will present network management information in the format of a HTML document, or in a format which may be used by an application which interacts with the browser to produce an HTML document representing the relevant network management information. In one embodiment, such an application may be a JAVA™ "applet".

The present invention also proposes a protocol, conveniently termed the Hypertext Network Management Protocol (HNMP) according to which a web-capable network management agent and a client can exchange data. In one embodiment, this is achieved by introducing an embedded method token directly into a URL string of a message transmitted from a client to the network management agent. Appropriate action is then applied to an identified URL object based on the embedded method token.

A description of the hardware in which the present invention may be employed, as well as the structure of the software which comprises the present invention will firstly be described below. Thereafter, a description of the methodology employed by the present invention will be provided.

3. System Description

3.1 Network

Figure 2:
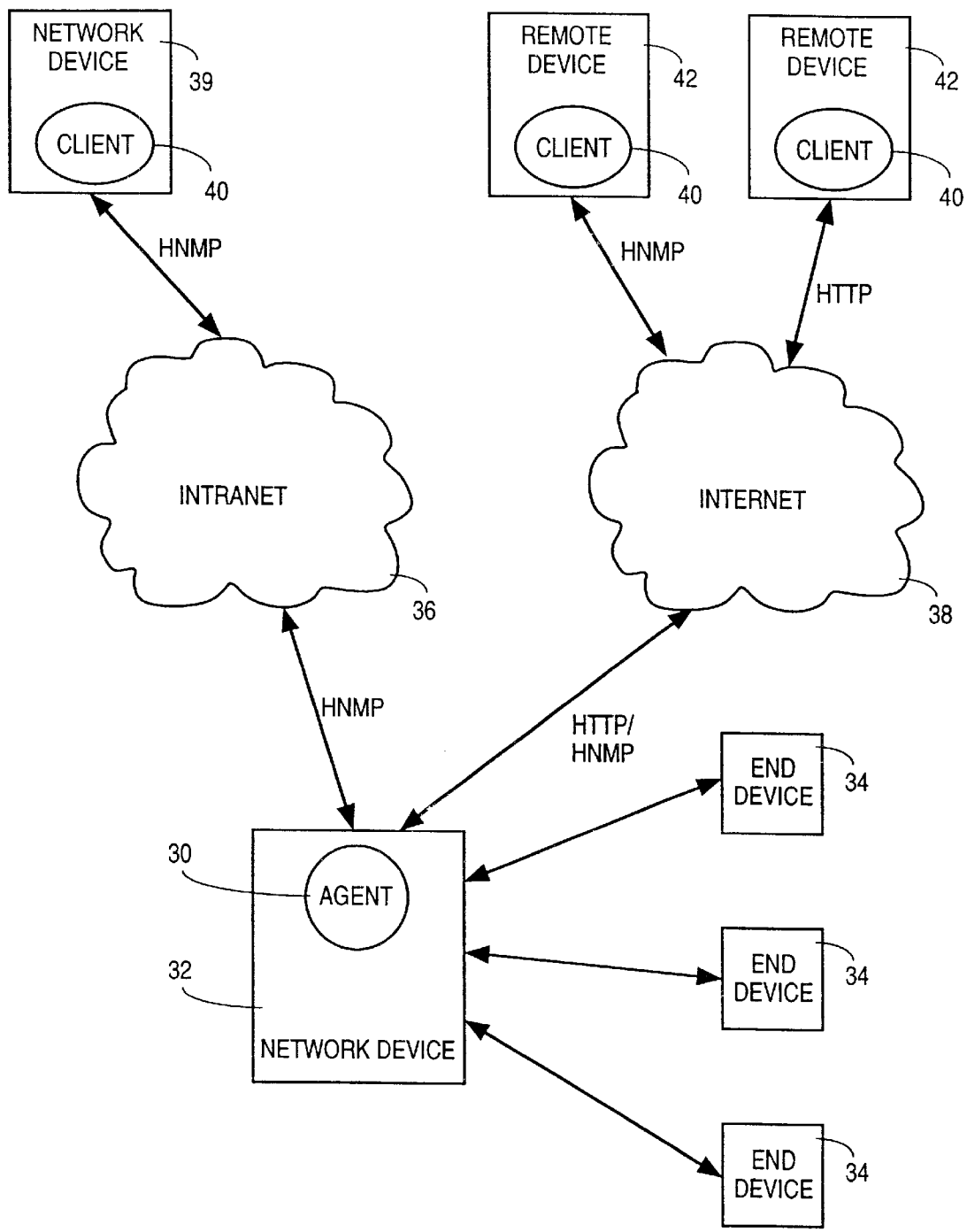
FIG. 2 is a schematic representation of a network device having a network management agent according to the present invention installed thereon, and connected to remote devices via an internet or an intranet.

Referring to FIG. 2, in one embodiment of the present inventions an embedded, web-capable network management agent 30 resides on a network device 32, to which a number of end devices 34 are coupled. The network device 32 may be a router, bridge, hub or any other network device on which network management agents commonly reside. The end devices 34 may be computers, servers, or peripheral devices. It will be appreciated that the network device 32 may furthermore be coupled to any number of further network devices.

The network device 32 is shown to be coupled to an intranet 36 and an internet 38. Also coupled to the intranet 36 is a remote device 39, such as a computer, on which resides a client 40, in the form of a web browser. Similarly, remote devices 42 and 44 each have a client 40 installed thereon and are coupled to the internet 38. The clients 40 propagate request messages to the network management agent 30 which, in response to the request messages, propagates response messages to the clients 40. In one embodiment, these response messages incorporate HTML documents, and accordingly the network device 32 may be viewed by the clients 40 as an HTML server. The network management agent 30 supports a set of managed objects, which in one embodiment are Management Information Base (MIB) objects. The set of MIB objects supported by the agent 30 are specific to the network device 32, and are termed the MIB view of the agent 30. The managed objects (or variables) provide information regarding the network device, such as, for example, the number of good or bad data frames received at and transmitted from the network device 32.

Requests received from client 40 address the managed objects supported by the agent 30 and, as will be described in further detail below, may request network management information regarding the network device 32 from the agent 30. This information is then propagated to the client 40 in a format which can be displayed on the requesting client 40.

3.2 The Network Device

Figure 3:
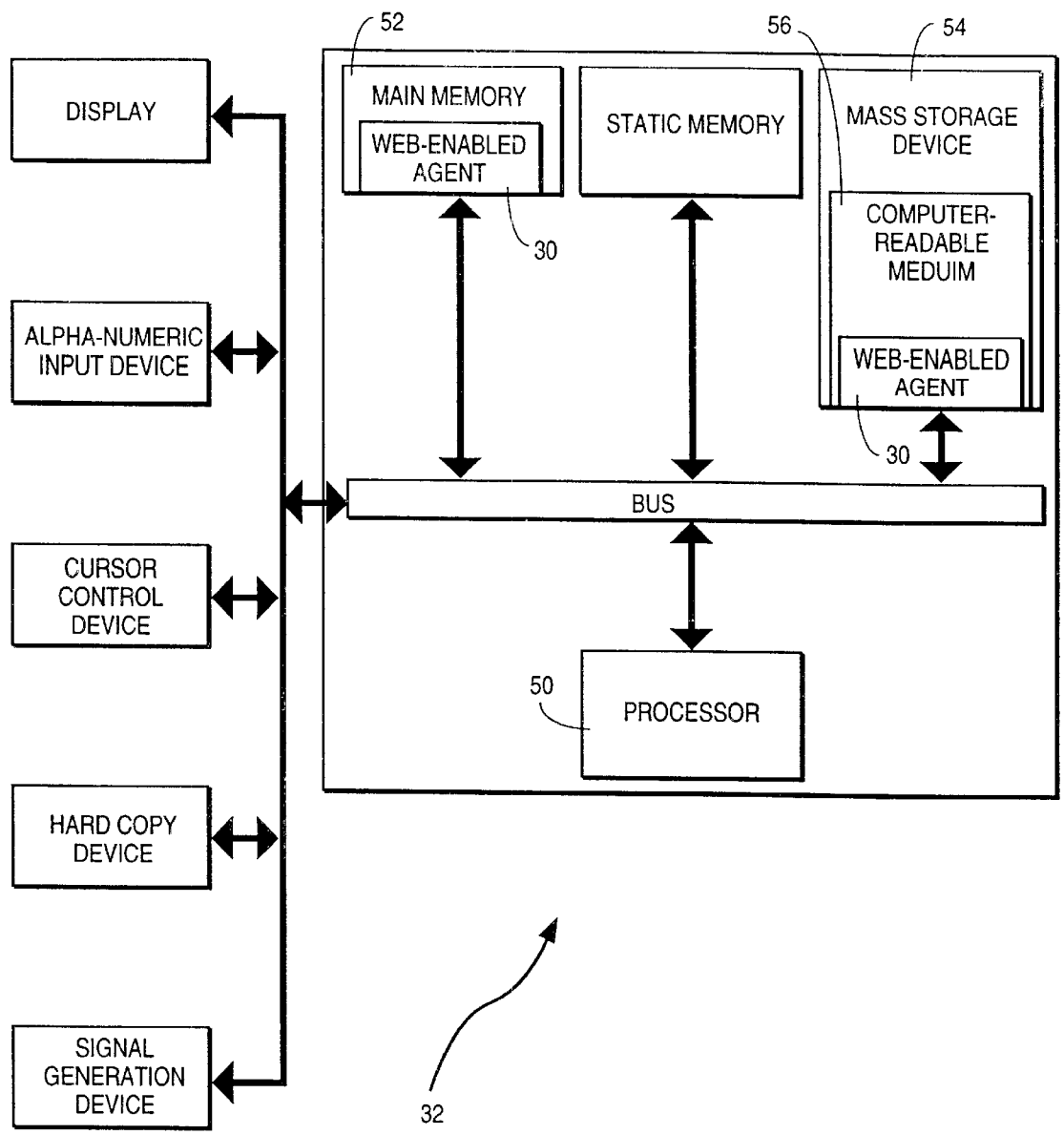
FIG. 3 is a schematic representation of a network device on which the network management agent according to the present invention is installed, and having a storage device including a computer-readable medium on which the agent is stored.

FIG. 3 shows one possible embodiment of a network device 32 in the form of a computer. The network device 32 includes a processor 50 for executing the various sequences of instructions which comprise the web-capable network management agent 30. The network device 32 further includes a main memory 52, in which the sequences of instructions which comprise the agent 30 may at least partially reside, as shown in FIG. 3, when the sequences of instructions are being executed by the processor 50. The device 32 further incorporates a mass storage device 54 which in one embodiment comprises a drive which operates to read data from, and write data to, a computer readable medium 56 on which the sequences of instructions comprising the agent 30 may be stored.

3.3 The Web-Capable Network Management Agent

The web-capable network management 30 comprises a number of manager modules, execution modules and data structures, the data structures being modified and maintained by the manager and execution modules. The agent 30 furthermore comprises an interface, namely a URL dictionary for interfacing between the various modules and the data structures.

3.3.1 The URL Dictionary and Data Structures

Figure 4:
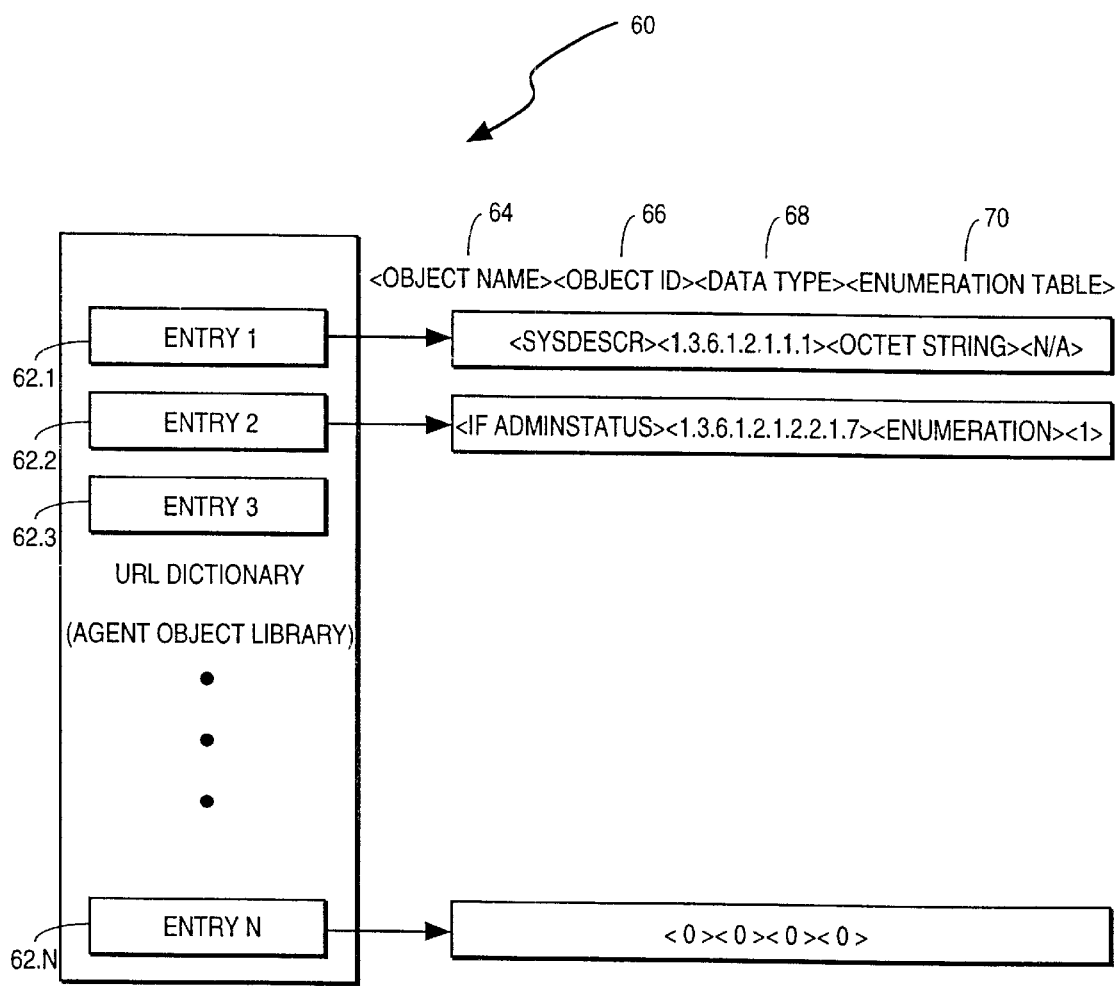
FIG. 4 is a diagrammatic representation of a Uniform Resource Locator (URL) Dictionary according to the present invention.

Referring now to FIG. 4, the network management agent 30 maintains a Uniform Resource Locator Dictionary (URLD) 60, which contains an entry 62 for each managed object supported by the agent 30. Each entry 62 comprises a number of fields including an OBJECT NAME field 64, and OBJECT IDENTIFIER field 66, a DATA TYPE field 68 and an ENUMERATION TABLE field 70. The OBJECT NANE field 64 contains a textual name for the managed object, which corresponds to a numeric object identifier contained in the OBJECT IDENTIFIER field 66. The DATA TYPE field 68 indicates whether an instance of the object will be an octet string, integer, or enumeration. In the case where the data type is indicated as being an enumeration, the ENUMERATION TABLE field 70 contains an integer corresponding to a status. For example, referring to entry 62.2 in the URLD 60, the data type is indicated as being an ENUMERATION, and the ENUMERATION TABLE field 70 indicates a value "1", corresponding to an "up" status. Similarly, a value of "2" in field 70 would indicate a "down" status, whereas a value "3" would indicate a "testing" status. The last entry in the dictionary, namely entry 62.N contains zeroes in all fields.

The URLD 60 provides the main interface between a request manager module, and the managed objects and file system of the agent 30. In one embodiment, the managed objects all comprise MIB objects, which may in turn be classified as SNMP objects, file objects, counter objects and miscellaneous objects.

Figure 5:
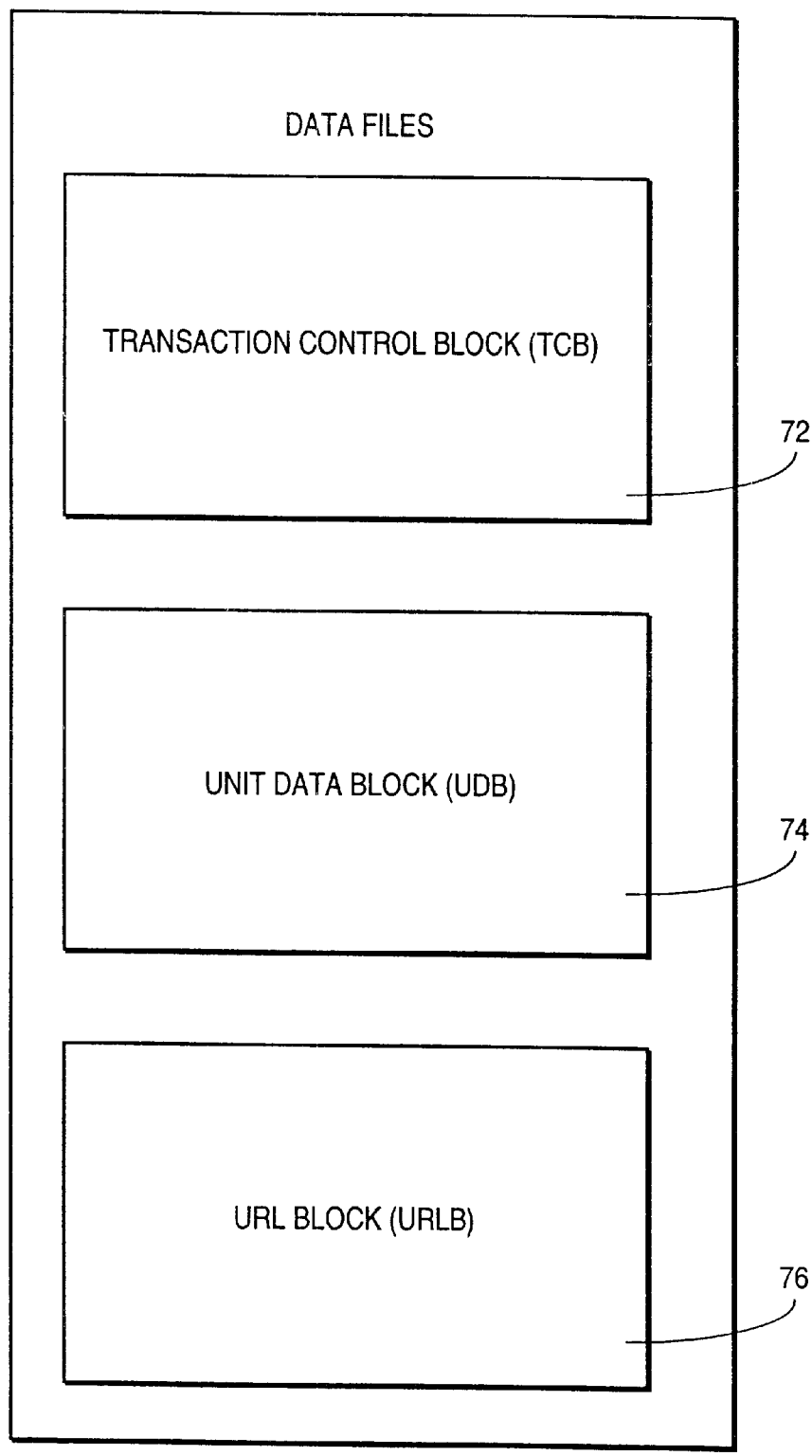
FIG. 5 provides a diagrammatic representation of data files maintained by the network management agent according to the present invention.

FIG. 5 shows the three primary data file types that are maintained by the web-capable network management agent 30. These file types comprise transaction control blocks (TCB) 72, unit data blocks (UDB) 74, and URL blocks (URLB) 76. Referring firstly to the transaction control blocks 72, a TCB 72 is created for each incoming request received at the network management agent 30 from a client 40. Each TCB 72 contains the following fields or attributes:

1. a unit data block identifier (UDB ID): The contents of this field identify a corresponding entry in the unit data block 74.
2. a received input data pointer: The memory references to the incoming data from the client 40.
3. a socket identifier: The contents of this field indicate the socket in which the incoming request was received.
4. a URLD Identifier: The identification of one of the many URLs in the URL dictionary. In essence, it is the address of a specific object in the URL pool.
5. a Header Record Pointer: The attributes related to the client request which are specific to the HTTP protocol. It allows both the Client and Server dealing in HTTP to exchange objects (URLs).

Response data to be provided by the agent 30 to a client may be too large to be written to a contiguous output buffer. Accordingly, response data may be divided into a number of blocks, each of which comprises a unit data block 74. Each unit data block 74 contains the following fields or attributes:

1. a pointer to a following, consecutive UDB 74.
2. the relevant response data.

Each URL instance has an allocated URL Block 76, which contains attributes relating it to the relevant URL. Each URL Block 76 will include the following fields or attributes:

1. the URI: This is the string which represents a managed object. The URI is the name of the URL object and items 2–5 below are the attributes.
2. an Action Method included within the URL instance: In one embodiment, the following methods could be indicated as being Action Methods:
   (a) ls:list files or directories
   (b) cat<filename>:display a file.
   (c) cr<filename>:create a file in the "/usr" directory.
   (d) rm<filename>:remove a file from the "/usr" directory.
   (e) ld<filename>:load a file from browser to the "/usr" directory in the server.
   (f) select: select the columns in a table.
3. Arguments: This is an array of argument records, and incorporates an argument name and an argument value.
4. URL Type: This field indicates the file extension type such as, for example, ".moca", ".html", ".gif", or ".txt".
5. Mode: This indicates the output format of the URL.

3.3.2 Manager Modules (The HTML Server)

Figure 6:
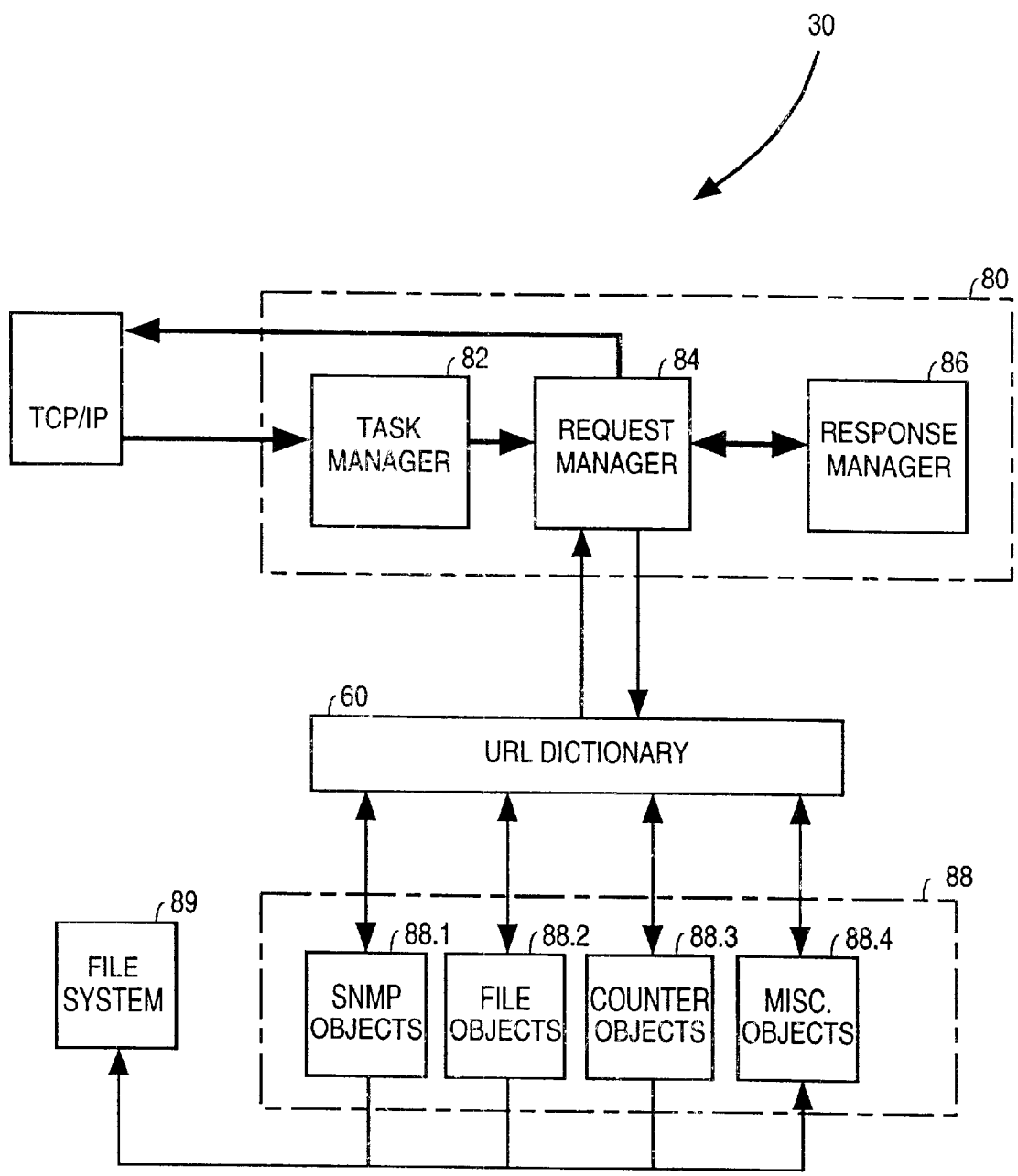
FIG. 6 is a schematic representation of a number of the modules, objects and files which comprise the network management agent according to the present invention.

FIG. 6 illustrates a number of the primary modules and objects of the web-capable network management agent 30, and also illustrates the interaction between these modules and objects. Three manager modules are shown to comprise a so-called "HTML server" 80, these manager modules comprising a task manager 82, a request manager 84 and a response manager 86. The manager modules which comprise the HTML server 80 manage network management functions performed in response to requests received from the client 40.

The task manager 82 is a daemon which is activated on system initialization and creates a socket on a dedicated HTML port (for example, port 80) and then listens on that port for incoming requests propagated to the agent 30 from a client 40. Upon receipt of an incoming request, the task manager 82 creates a socket, and spawns a request manager 84, which is dedicated to managing the received request. This process repeats itself until a predetermined number (for example four) of socket and request manager pairings have been created. Once the predetermined number of sockets and request manager pairings have been created, the task manager will distribute further incoming requests to queues associated with each pairing on a rotating basis.

As stated above, a dedicated request manager 84 is assigned to manage each incoming request received at the agent 30 from a client 40. The request manager 84 is central to the HTML server 80, and interacts with the response manager 86, the URL dictionary 60 and a number of execution modules to process the request and initialize a set of data files, as shown in FIG. 5, for the request. A detailed explanation of the functioning of the request manager 84 will be provided below.

The response manager 86 has the task of formatting and buffering output data, which is to be propagated from the agent 30 to the client 40 as a response to a request.

3.3.3 Execution Modules

Figure 7:
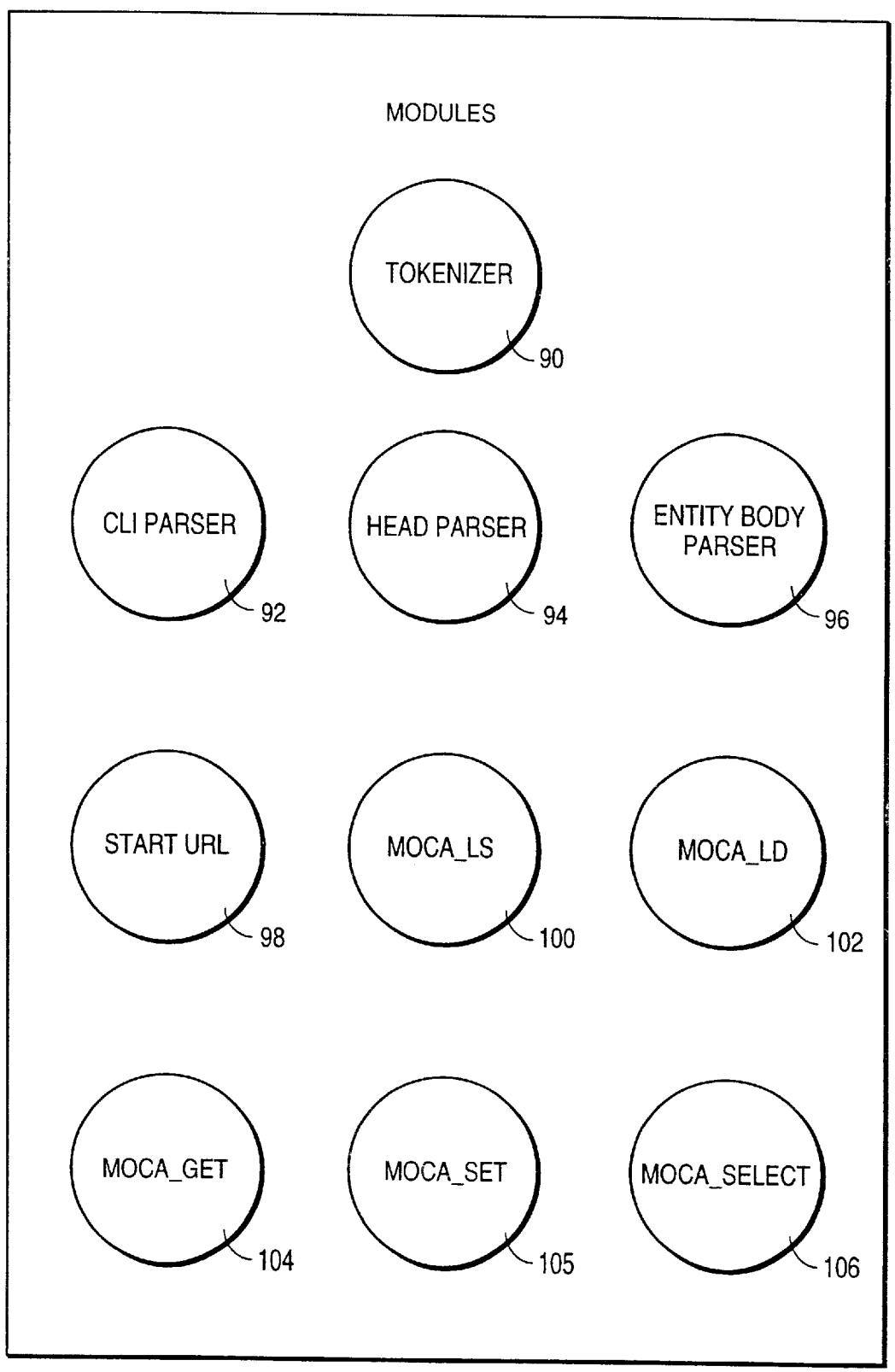
FIG. 7 is a diagrammatic representation of a number of software modules that are invocable within the network management agent of the present invention.

FIG. 7 shows a grouping of execution modules which are called, or initiated, by the request manager 84 to perform specific functions in processing of a request.

1. a Tokenizer module 90: A tokenizer module is a module which has the embedded knowledge to separate the incoming stream of data into manageable tokens. Based on this knowledge the tokenizer module 90 determines whether or not the incoming data conforms to the negotiated protocol. It is called by the request manager 84 which feeds it the data stream. The tokenizer module 90 breaks down the data stream into tokens and then activates appropriate parsers for each of the tokens.

2. a Command Line (CLI) Parser 92: The CLI parser 92 is responsible for parsing a request-line of a request message received at the agent 30 and for initializing a URL block 76 for the request with information, described above, pertaining to that request.

3. a Head Parser 94: This module parses a Request-Header of a request message received at the agent 30. The head parser module 94 is responsible for initializing a transaction control block 72 for a received request message. The header of the request message is parsed to extract data contained in the following fields:
   1. <HTTP-Version>: the version of HTTP supported by the client (browser).
   2. <if-Modified-Since>: the expiration date of the URI.
   3. <Allow>: methods applied to the URI.
   4. <Content-Length>: the length of the entity body of the request message.
   5. <Content-Type>: the URI type (text, html, gif).

4. Entity Body Parser 96: This module is responsible for parsing the entity body of a request message received from the client 40, or a response message to be propagated to the client 40, to locate a Server Side Include (SSI). A Server Side Include is a tag within a HTML document which indicates to a server, from which an HTML document is being propagated, that information accessible by the server is to be incorporated into the HTML document. SSI tags are understood only on the server side, and are especially useful to include the result of a certain action taken on the server side (i.e. dynamic data) within a static HTML document. Accordingly, by using SSI tags, it is possible to create an HTML document which interlaces static and dynamic data. The following code sets out an illustrative example of an HTML document incorporating SSI tags. In the present invention, a <MOCA> tag (and a corresponding </MOCA> tag) identify the SSI portion of an HTML document.

```
<!DOCTYPE HTML PUBLIC"-//IETF//DTD HTML//EN">
<HTML>
<HEAD>
<TITLE>Presto Horne Page</TITLE>
</HEAD>
<BODY>
Welcome to the Presto Home Page. Fasten your surfbelt and hop on in
for an adventurous tour of my Home and neighbor.
<UL>
<LI><A HREF="/system/presto.html">About Me</A>
<LI><A HREF="/system/topology.html">My neighbor</A>
<LI><A HREF="/system/documents.html">User's Guide</A>
</UL>
My current Port Status Table:
<BR>
<TABLE BORDER>
<CAPTION>Presto Port Status Table</CAPTION>
<MOCA code=select>
<PARAM="Table" value="s5EnPortTable">
</MOCA>
</TABLE>
<P>
</BODY>
</HTML>
```

EXAMPLE 1

For example, the entity body parser module 96 recognizes the following SSI commands as being valid when included between the <MOCA> and </MOCA> tags as identified above:
   1. ls: list files or directories.
   2. cat: display files.
   3. cr: create a file in a user directory.
   4. rm: remove a file from a user directory.
   5. ld: load a file from a browser to a user directory in the server.
   6. select: select the columns in a table sorted by column in ascending or descending order.

5. a Start URL module 98: this module is called by the request manager 84, and once activated, proceeds to retrieve a URL name and its type from the URL Block 36. The module then recognizes the URL type, and accesses the resource identified by the URL from an appropriate location. For example, if the URL identifies a file, the file is accessed via a file read system. If the URL is identified as being a MOCA command, then a MOCA library is accessed. Alternatively, if the URL identifies a managed object, this object is then accessed via the URL Dictionary 60.

There are furthermore a number of callback functions within the MOCA library, namely:
   6. Moca_ls module 100: this callback function accesses the file system, and retrieves file names which are then formatted into HTML format in the appropriate Unit Data Block 74 for propagation to the client 40.
   7. Moca_ld module 102: this callback function is used to load and transfer a remote file to the agent 30. The location of the remote file is determined by an agent-.config file, and the file name in the URL.
   8. Moca_get module 104: this module is used to get the value of a certain object (URL) within the URL dictionary.
   9. Moca_set 105: this module is used to set the value of a read and write object within the URL dictionary.
   10. Moca_select 106: this call back function is used to provide formatted output table data.

3.3.4 Methodology—the HTML server

Figure 8:
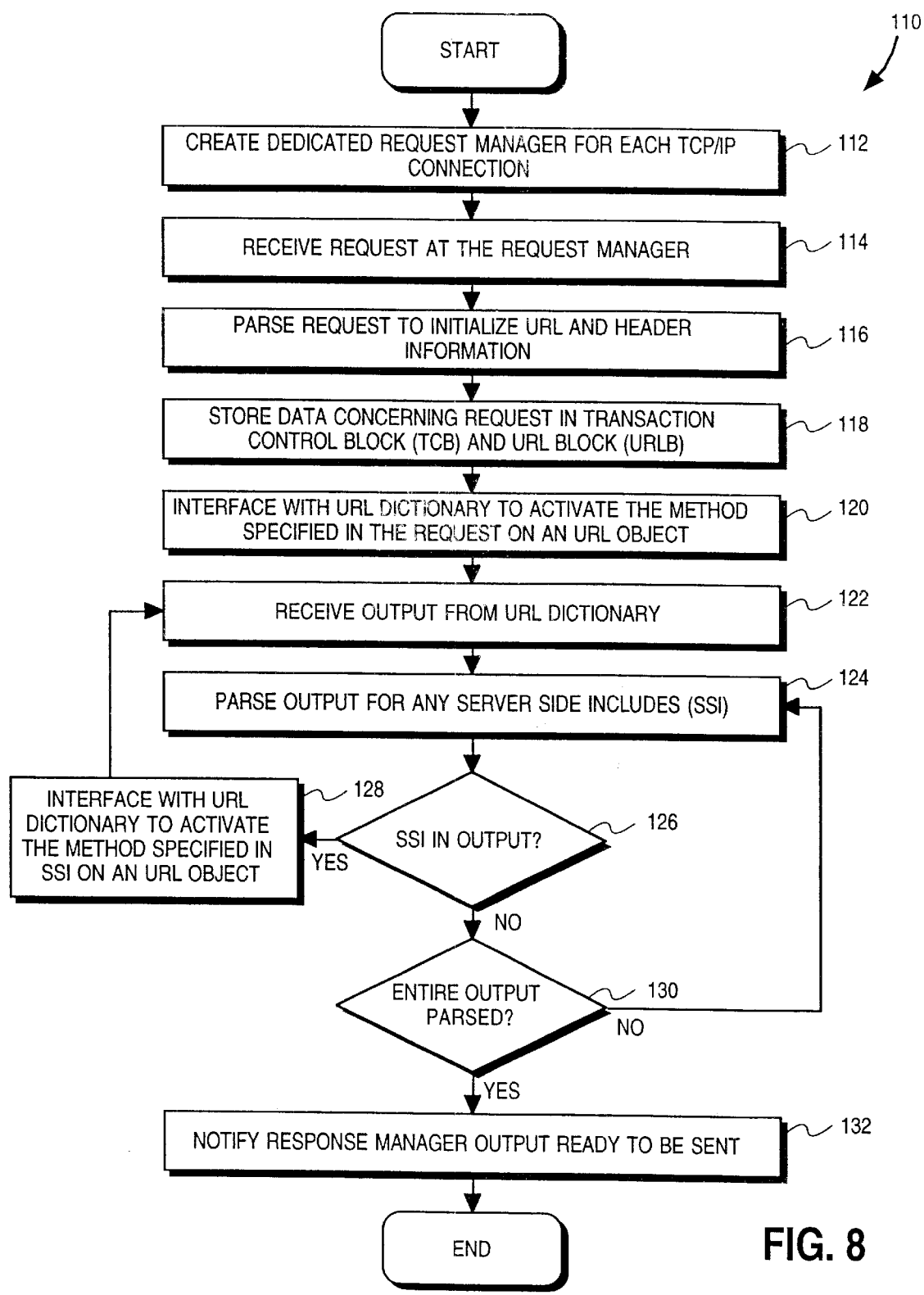
FIG. 8 is a flow chart illustrating a method according to the present invention by which the network management agent processes a received network management request.

The method by which a request received at the HTML server 80, comprising the task manager 82, the request manager 84 and the response manager 86, is processed will now be described with reference to FIGS. 6, 8 and 9. FIG. 8 is a flow chart indicating the various steps performed by the HTML server 80, and FIG. 9 is a state diagram, indicating the various states in which the request manager 84 resides during performance of the steps shown in the flow chart of FIG. 8.

Referring firstly to FIG. 8, at step 112 the task manager 82 creates a socket on a dedicated port, for example port 80, and then listens at that port for an incoming request from the client 40. On the receipt of a request, and the establishment of a TCP/IP connection for that request, the task manager creates a new socket and a dedicated request manager to oversee the processing of the request.

At step 114, the incoming request is received at the request manager 84 for processing. The request manager is at this time in an idle state 150, and calls the Tokenizer Module 90, Command Line Parser 92, the Head Parser 94 and the Entity Body Parser 96 to parse the request at step 116 of the method 110. At step 118, the data extracted from the request is stored in a transaction control block (TCB) 72 and at least one URL block (URLB) 76 associated with the request. More specifically, the Command Line Parser 92 parses a request-line of the request, and initializes (or creates) a URL block 76 with values for the attributes of such a block, as discussed above. The Head Parser 94 parses the headers of the request and initializes a Transaction Control Block (TCB) 72 for the request. The Entity Body Parser 96 then parses the entity data body of the message to search for any Server Side Includes (SSIs), and creates and initializes a further URL Block 76 for each SSI encountered.

Figure 9:
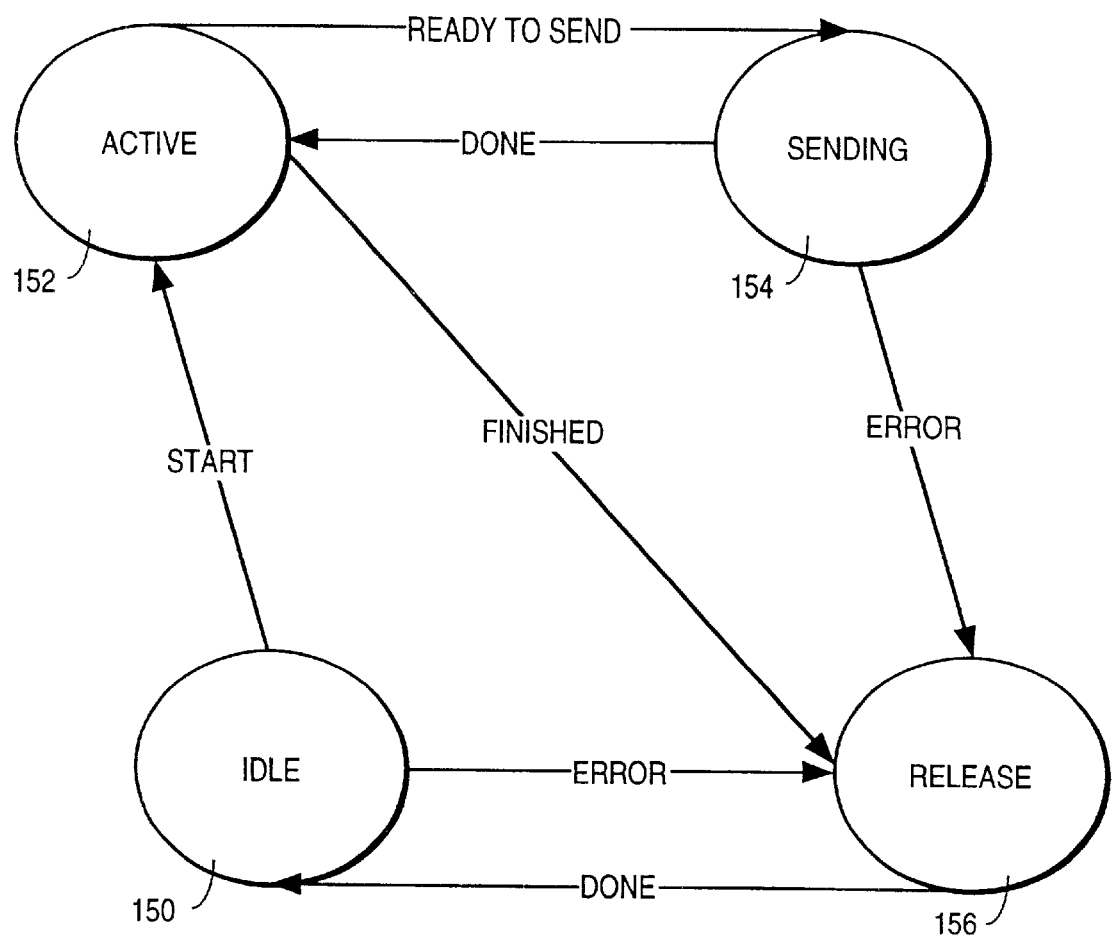
FIG. 9 is a state diagram illustrating the states in which a request manager software module, comprising part of the network management agent according to the present invention, can reside.

At step 120, the request manager 84 enters an active state 152, as shown in FIG. 9, and interfaces with the URL Dictionary 60 via an appropriate Application Program Interface (API) to activate the requested method (now indicated in the URL block 76) on a URL object identified in the request. More specifically, the request manager 84 interfaces with the URL Dictionary 60 by calling the Start URL module 98. The URL Dictionary 60 then uses the URL attribute value maintained in the appropriate URL Block 76 to access the managed objects 88 (as shown in FIG. 6), or the file system 89. At step 122, assuming the access operation is successful, the URL Dictionary 60 returns output data to the request manager 84, in the form of a series of Unit Data Blocks 74.

At step 124, the output data is again parsed by the Entity Body Parser module 96 to locate any Server Side Includes within the output. If the Entity Body Parser module 96 locates a Server Side Include in the output at decision block 126, the method proceeds to step 128 wherein the request manager 84 again interfaces with the URL Dictionary 60 to activate the method of the Server Side Include on a URL object. This iteration proceeds until it is determined at decision block 130 that all output data has been parsed. The method 110 then proceeds to step 132, where the request manager 84 enters the sending state 154, as shown in FIG. 9. The request manager 84 then communicates with the response manager 86 by instructing the response manager 86 to flush "ready to send" data to the client 40. On receiving a successful handshake from the response manager 80, the request manager 84 returns to the active state 152. On the other hand, should a transmission or "time out" error occur at this stage, the request manager enters a release state 156. Errors may result from the following:

1. the client might close the connection prematurely; or
2. there may not be any further buffer capacity available at the transport level to send out any more data.

Assuming a successful handshake with the response manager 86, the request manager 84 will transition from the active state 152 to the release state 156, and will release all resources associated with the request and return to the idle state 150.

It may also occur that, at step 122, the output data received from the URL Dictionary 60 may exceed the capacity of an output buffer, in which case the request manager 84 enters the sending state 154 and communicates with the response manager 86 to flush the contents of the output buffer to a client 40. Once the output buffer has been flushed, the request manager 84 then returns to the active state 152.

The response manager 86 transitions between an idle state (not shown) and an active state (not shown). More specifically, in the idle state, the response manager 86 waits for an incoming request directing that a UDB 74 chain be sent over a socket specified in an appropriate Transaction Control Block 72. The response manager 86 enters the active state once it received a UDB 74 from the request manager 84.

In the active state of the response manager 86, the entire output buffer is written to the socket, one Unit Data Block (UDB) 74 at a time. An ABORT message is sent to the request manager 84 if an error occurs in the transmission of the output data to a client 40. Once the response manager 86 is informed by the request manager 84 that the last request message has been received, the response manager 86 closes down the TCP/IP connection for the request in process.

3.4 Protocol for Performing a Network Management Transaction Between a Web—Enabled Network Management Agent and A Web Browser (the Hypertext Network Management Protocol)

A web-enabled network management agent 30, which is capable of receiving a network management request from a client 40, in the form of a web browser, and of propagating the results of a network management function performed in response to such a request in a format capable of display by the browser, has been described above. A description of the protocol by which request messages are propagated from the client 40 to the agent 30, and by which response messages are propagated from the agent 30 to the client 40, will now be described.

The existing HTTP protocol is specifically directed towards performing a method (or operation) on a single object identified by a URI, URN or URL. The methods specified by the HTTP protocol are directed towards the retrieval of static documents, such as HTML documents, as well as the storing of documents under a specified URL. The method of operation on a URL object is specified by the client. However, the HTTP protocol is particularly unsuited to network management functions for a number of reasons. For example, the HTTP protocol does not facilitate the retrieval or manipulation of multiple URL objects. Accordingly, complex and clumsy Application Program Interfaces (APIs) and Common Gateway Interfaces (CGIs) must be written to allow for the management of objects on the server side.

The Hypertext Network Management Protocol (HNMP) proposed by the present invention seeks to address the limitations of the HTTP protocol with respect to network management functions by introducing an embedded method token directly into a URL string. The method specified by the embedded method token is then applied to a URL object. Accordingly, the HNMP protocol provides a greater degree of functionality than the HTTP protocol, making the HNMP protocol particularly suitable for network management purposes.

3.4.1 Functional Software Layers

Figure 10A:
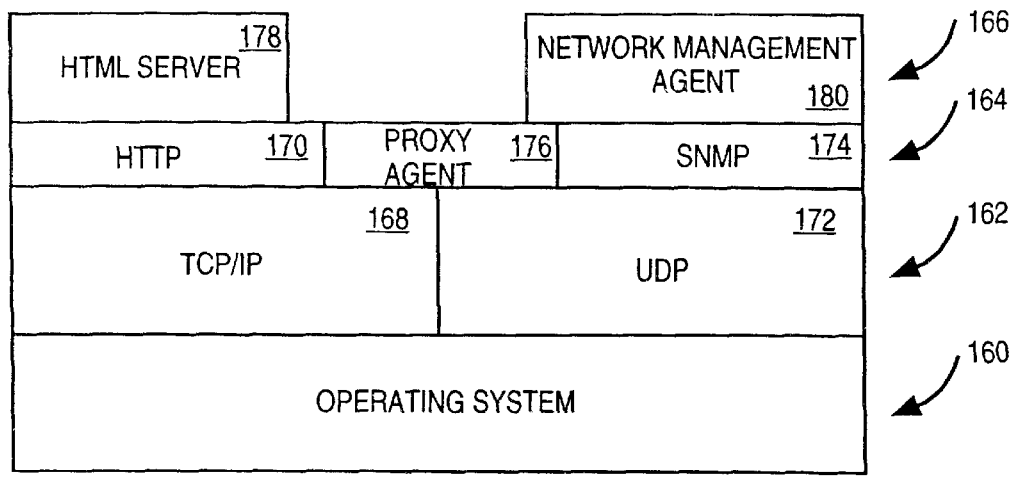
FIG. 10A shows the software functional layers within a network device shown in FIG. 1B.

Referring to FIG. 10A there is shown a diagrammatic representation of the software functional layers resident on the network device 14 shown in FIG. 1B. The functional layers comprise an operating system layer 160, a transport layer 162, a protocol layer 164 and an application layer 166. The transport layer 162 may include a TCP/IP protocol 168, which provides the transport layer for the HTTP protocol 170, and a UDP protocol 172 which provides the transport layer for the SNMP protocol 174. As described above, a proxy agent 176 translates messages formatted according to the HTTP protocol to a format specified by the SNMP protocol, and vice versa. An HTML server 178 is able to communicate with a client, in the form of a web browser, using the HTTP protocol 170, and a network management agent 180 is able to communicate with a network management application via the SNMP protocol 174.

Figure 10B:
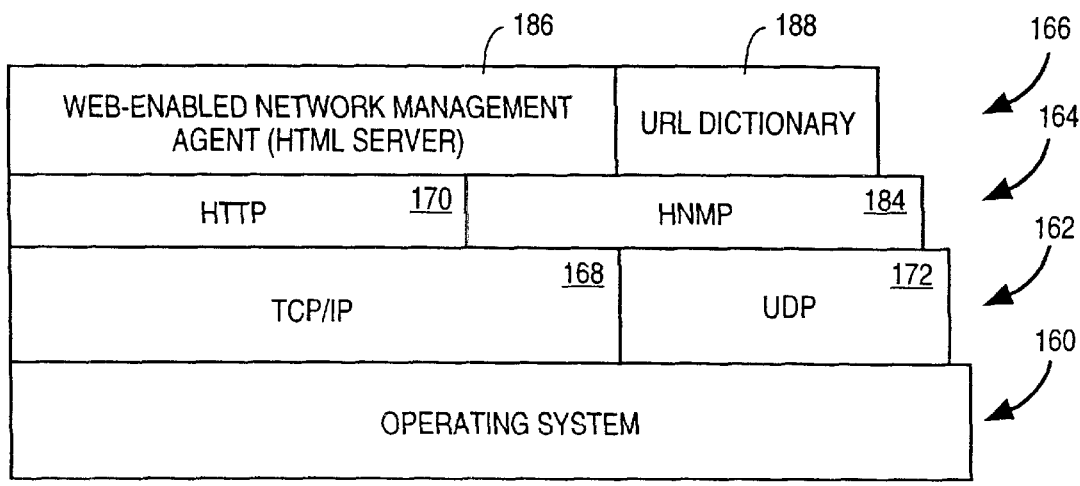
FIG. 10B shows the software functional layers within a network device according to the present invention.

Referring now to FIG. 10B, there is shown a diagrammatic representation of the software functional layers installed on a network device which is capable of communicating with a browser using the HNMP protocol, and having a web-capable agent according to the invention installed thereon. The functional layer structure shown in FIG. 10B differs from that shown in FIG. 10A in that the protocol layer need not include a proxy agent or the SNMP protocol. The application layer 166 comprises the web-capable network management agent 186, and a URL dictionary 188. The agent 186 is able to communicate with a web browser utilizing any of the protocols included in the protocol layer 164.

3.4.2 Response—Request Exchange

Figure 11:
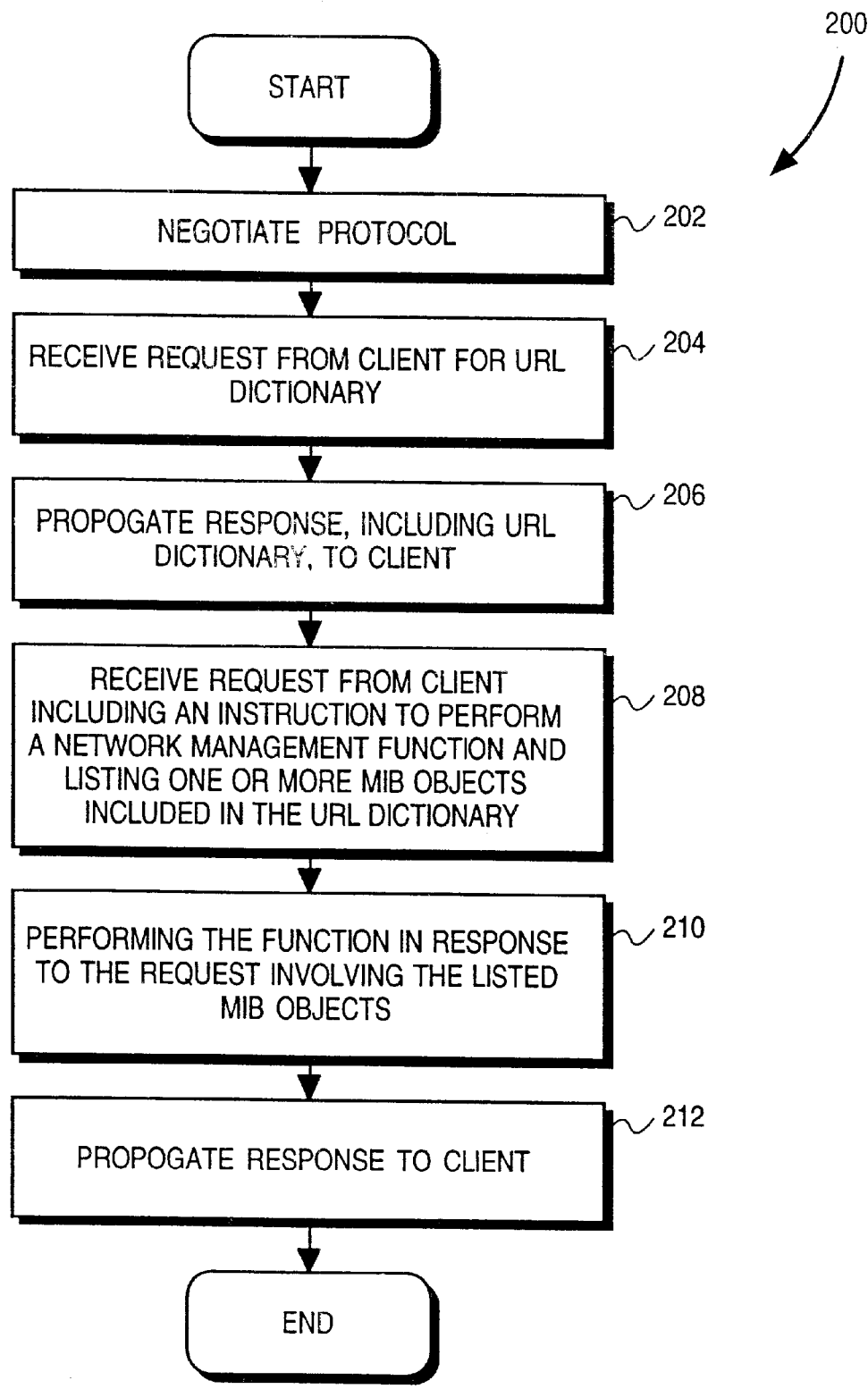
FIG. 11 is a flow chart illustrating a generic method of performing a network management transaction according to the present invention.

Referring now to FIG. 11, there is shown a method by which request and response messages are exchanged between an HTML client, such as a web browser, and a web-capable network management agent, functioning as an HTML server. At step 202, the client and the agent enter into a protocol negotiation, and establish the HNMP protocol as the communication protocol. Contrary to the HTTP protocol wherein a connection between a client and a server is severed once a request or a response message has been transmitted, the agent 30 maintains a TCP/IP connection between the client and itself until the client severs the connection, or the agent itself severs the connection. Accordingly, numerous request and response exchanges can occur without the connection being severed.

At step 204, the client propagates, and the agent 30 receives, a request message requesting that the agent 30 supply a URL Dictionary 60 to the client. As discussed above, the URL Dictionary 60 comprises a list of managed objects supported by the agent. At step 206, the agent 30 propagates a response message to the client, the response message incorporating the URL Dictionary 60. Accordingly, the client is able to ascertain from the response message which managed objects are supported by the agent 30. The agent 30 furthermore includes an HTML document in the body of the response message. This HTML document is displayable by the client to present a user with a menu of various network management options that can be exercised. More specifically, the HTML document contains the hypertext links to managed objects supported by the agent 30. The HTML document may optionally present the network management functions in a tabular form.

At step 208, the client propagates a request to the agent 30, the request including an instruction to perform a network management function. The request further identifies one or more managed objects, extracted from the URL Dictionary 60, on which the network management function is to be performed. In one embodiment, the network management function is either a GET, SET or TRAP function. Each managed object identified within the request message is identified by an object identifier, which is extracted from an OBJECT IDENTIFIER field 66 of a respective entry within the URL Dictionary 60. For example, the object identifier "1.3.6.2.1.1.1" would identify the "sysDescr" MIB object. At step 210, the agent 30 performs the function on the managed objects, according to the object identifier in the request message from the client. At step 220, the agent 30 propagates an appropriate response message back to the client.

It will be appreciated that once steps 202, 204 and 206 have been completed, the client is able to transmit numerous request messages, either automatically or in response to a manual input from a user, to the agent 30, requesting various network management functions. Thus, for each occasion that steps 202–206 are performed, the method may involve numerous iterations of steps 208–212.

The agent 30 may also generate an unsolicited "response" message for propagation to the client in the event of an alarm or alert condition, which requires a network administrator's immediate attention. Such alarm responses may also be generated in response to a trap installed on the agent 30.

Figure 12:
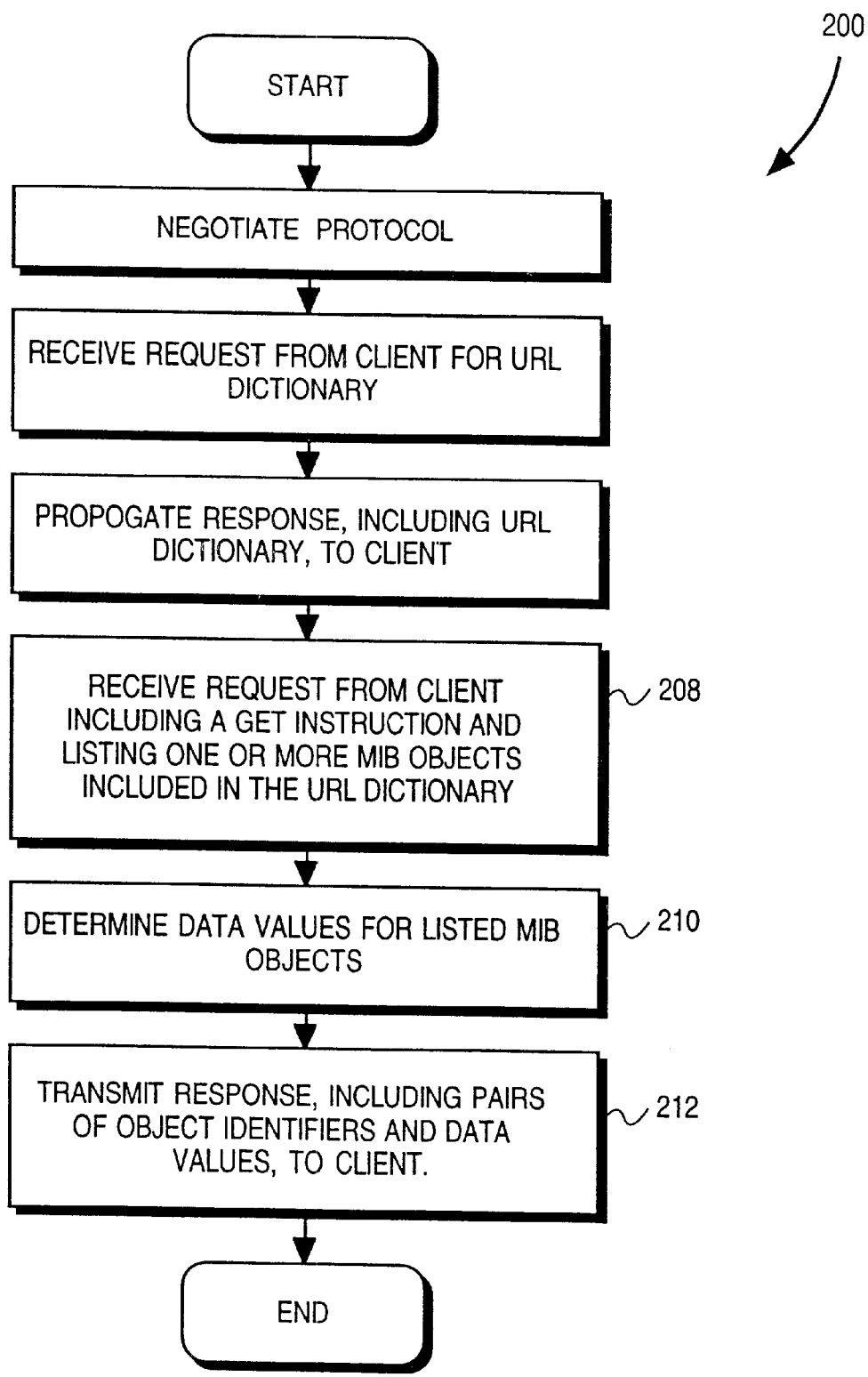
FIGS. 12–14 are flow charts illustrating specific examples of the generic method shown in FIG. 11.

FIG. 12 shows a specific example of the method 200, in which the request message propagated at step 208 includes a GET instruction and identifies one or more MIB objects extracted from a URL Dictionary 60. In this case, at step 210, the network management agent will determine specific values (or instances) of the MIB objects, and these values, paired with the appropriate object identifiers, will be propagated back to the client from the agent at step 212.

Figure 13:
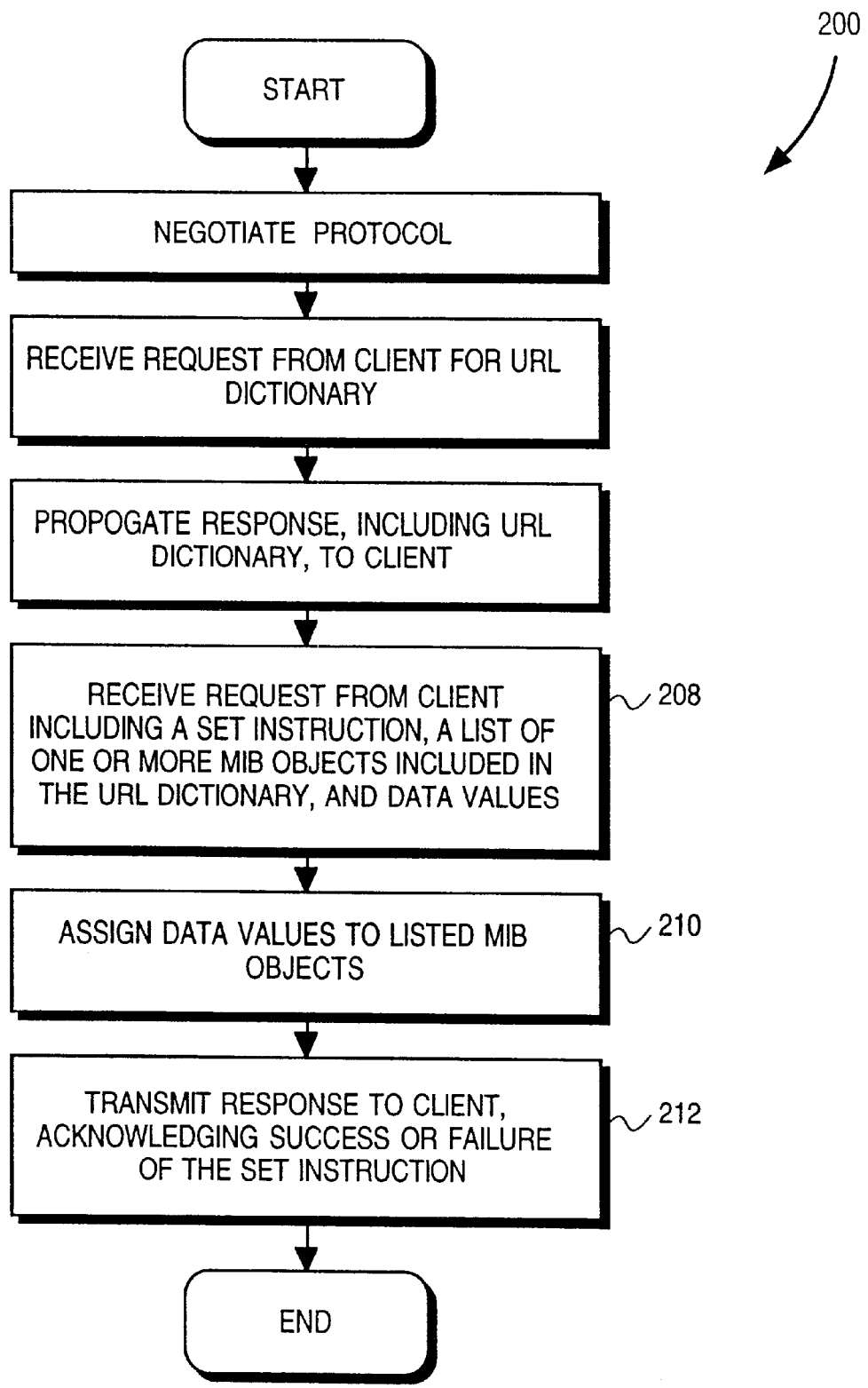

Certain network management functions may allow data values to be assigned to certain MIB objects. FIG. 13 shows a further specific embodiment of the method 200, in which the network management function comprises a SET instruction, which is propagated within a request message, together with one or more MIB object identifiers and associated data values, from the client to the agent at step 208. At step 210, the agent 30 assigns the data values to the respective MIB objects, and at step 212 the agent transmits a response to the client, acknowledging success or failure of the set instruction.

Figure 14:
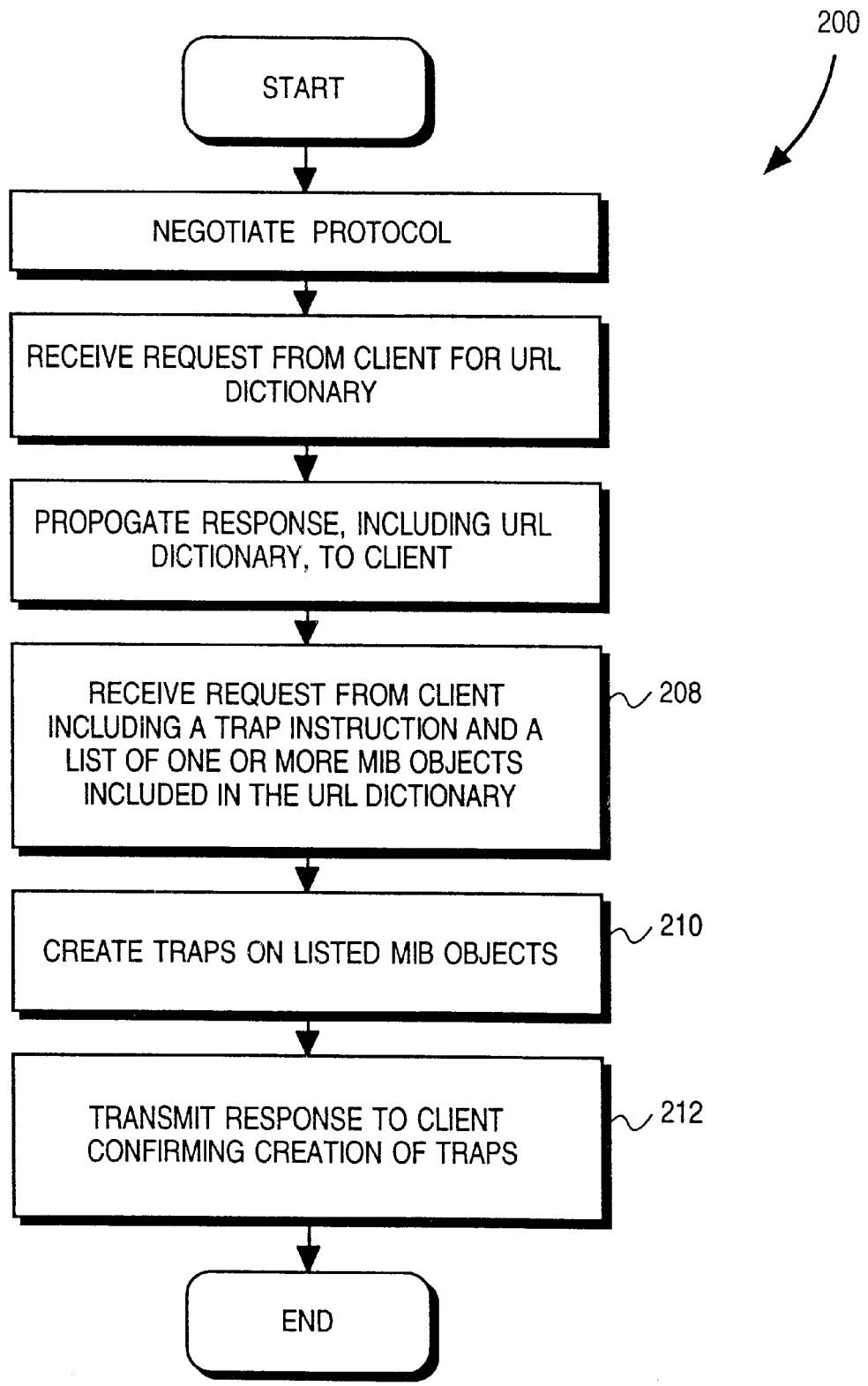

FIG. 14 shows yet another specific embodiment of the method 200. At step 210, a request message including a TRAP instruction, and listing one or more MIB objects extracted from the URL Dictionary 60, is propagated from the client to the agent 30. At step 210, the agent 30 creates traps on the listed MIB objects. Accordingly, any change in the value of the MIB objects identified in the request message will cause a response message to be transmitted to the client. At step 212, the agent 30 transmits a response message to the client, confirming the creation of the requested traps.

Figure 15A:
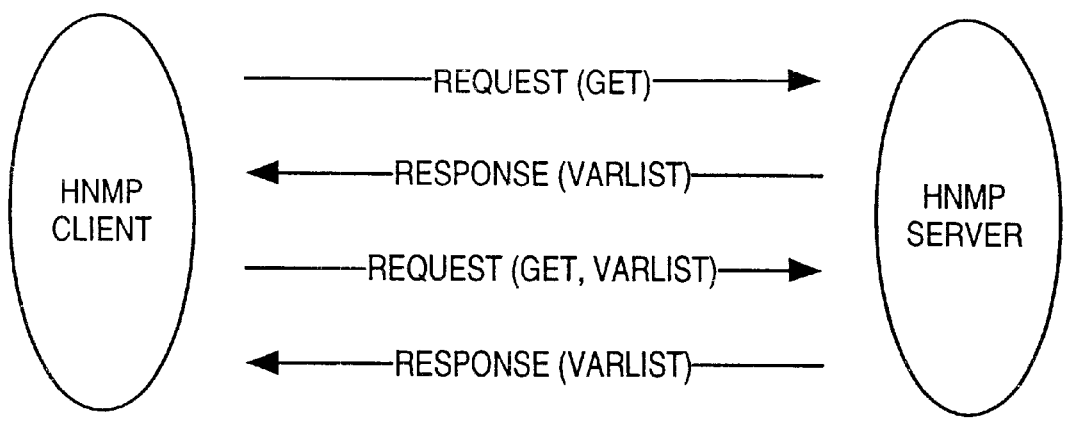
FIGS. 15A–15C are schematic illustrations of the exchange of request and response messages between a browser and a network management agent according to a protocol proposed by the present invention.
Figure 15B:
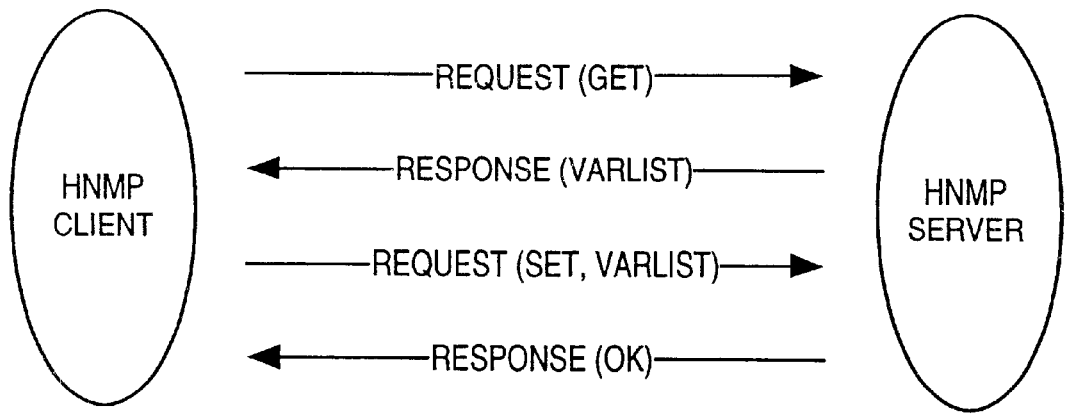
Figure 15C:
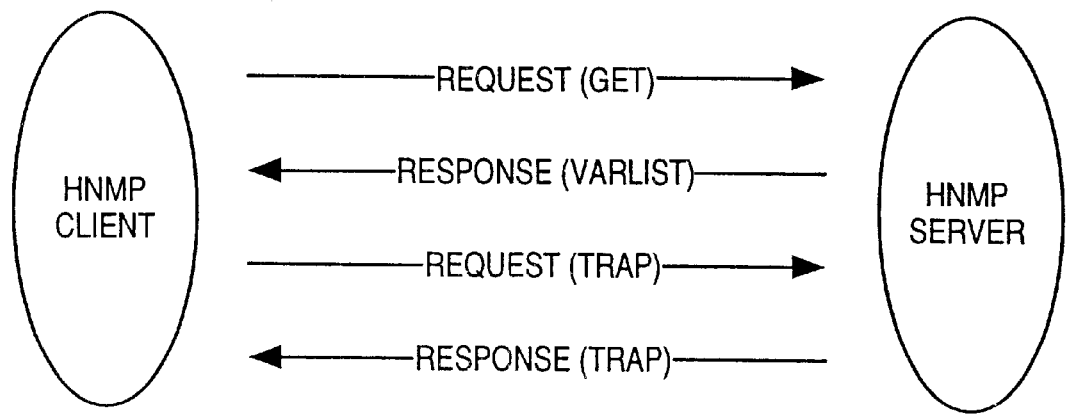

FIG. 15A–15C provide a representation of the exchange of request and response messages between an HNMP client and an agent 30, functioning as an HNMP server.

The GET instructions discussed above are particularly useful in allowing a browser to display an instantaneous measurement or value of a certain network management function parameter, identified by a MIB object. Furthermore, by periodically transmitting GET requests to an agent 30, a client in able to provide a network manager viewing a browser with a continual update of a monitored parameter or MIB object. For example, an object identifier may address a "GOOD FRAMES" managed object, which maintains a record of the number of uncorrupted message frames received at a specific network device which the agent is monitoring. By continually directing a GET instruction at such a "GOOD FRAMES" managed object, the client is able to provide a network manager with a continual indication of the number of uncorrupted frames being received at the network device. Similarly, by setting a trap on, for example, the "GOOD FRAMES" managed object, a user can be provided with a continual update regarding the number of uncorrupted frames received at the network device.

As mentioned above, a response message from the agent 30 (in response to a request incorporating a GET instruction) incorporates at least one object identifier and a data value assigned to that object identifier. The data value may be incorporated in an HTML document for display as a numeric value. Alternatively, the data value may be utilized by a JAVA™ applet residing on the network device, which interacts with the agent 30, to provide a graphic display of a monitored network parameter.

FIGS. 15A–15C provide a diagrammatic representation of the exchange of requests and response messages for each of the specific embodiments of the method 200 shown in FIGS. 12–14. The term "varList" is shown to be incorporated in a number of the response and request messages, and refers to a variable list incorporating at least one object identifier, which may or may not have a data value associated therewith.

3.4.3 Request and Response Message Format

Figure 16:
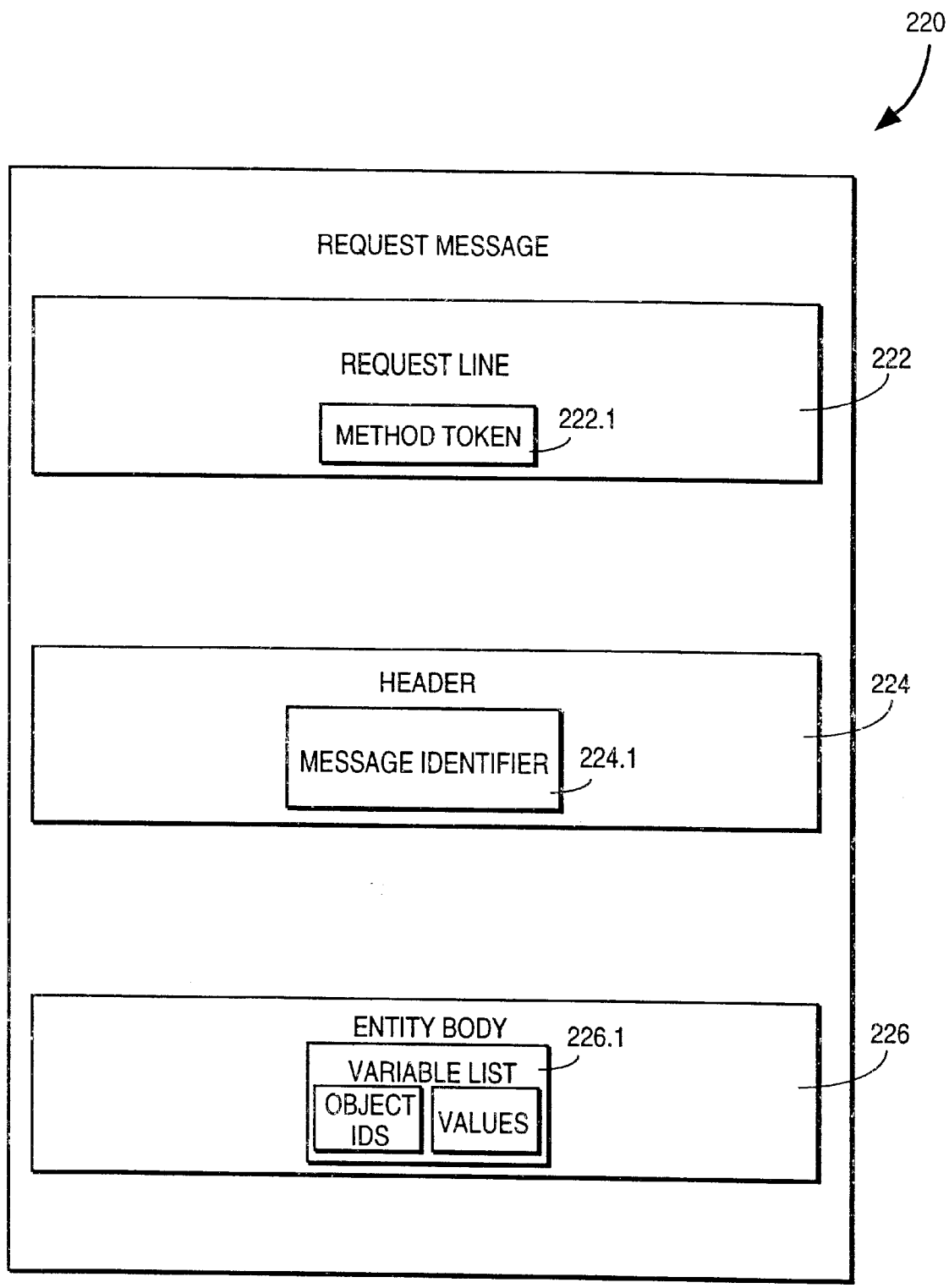
FIG. 16 is a diagrammatic representation of a request message structure according to the present invention.

FIG. 16 provides a diagrammatic representation of the structure of a request message 220, which is propagated from the client to the agent 30. The request message 220 comprises three primary portions, namely a request line 222, a header 224 and an entity body 226. The request line 222 includes an embedded method token 222.1. The request line 222 is particularly significant in that the method token 222.1 is embedded therein, and specifies an action (or method) to be applied to a managed object identified within the request message 220. Furthermore, the request line 222 may include multiple method tokens. For example, embedded method tokens could specify GET, SET or TRAP functions, as described above, to be performed on the managed objects listed within the request message.

The header 224 contains further information fields, including a message identifier field 224.1 which lists the network management functions or methods known to the agent 30. In one embodiment, these would include the GET, SET and TRAP methods. This list of network management functions is established during the protocol negotiation phase between the client and the agent 30.

The entity body 226 incorporates a variable list field 226.1 which may accommodate a list of object identifiers and respective values associated with each of these object identifiers. A request message sent from a client to an agent 30 to request the URL Dictionary 60 will contain no values in the variable list. A request message incorporating a GET method token in the request line 222 will merely contain object identifiers, which will have no values associated therewith. A request message incorporating a SET instruction, as illustrated in FIG. 15B, will include at least one object identifier and a value associated therewith.

Figure 17:
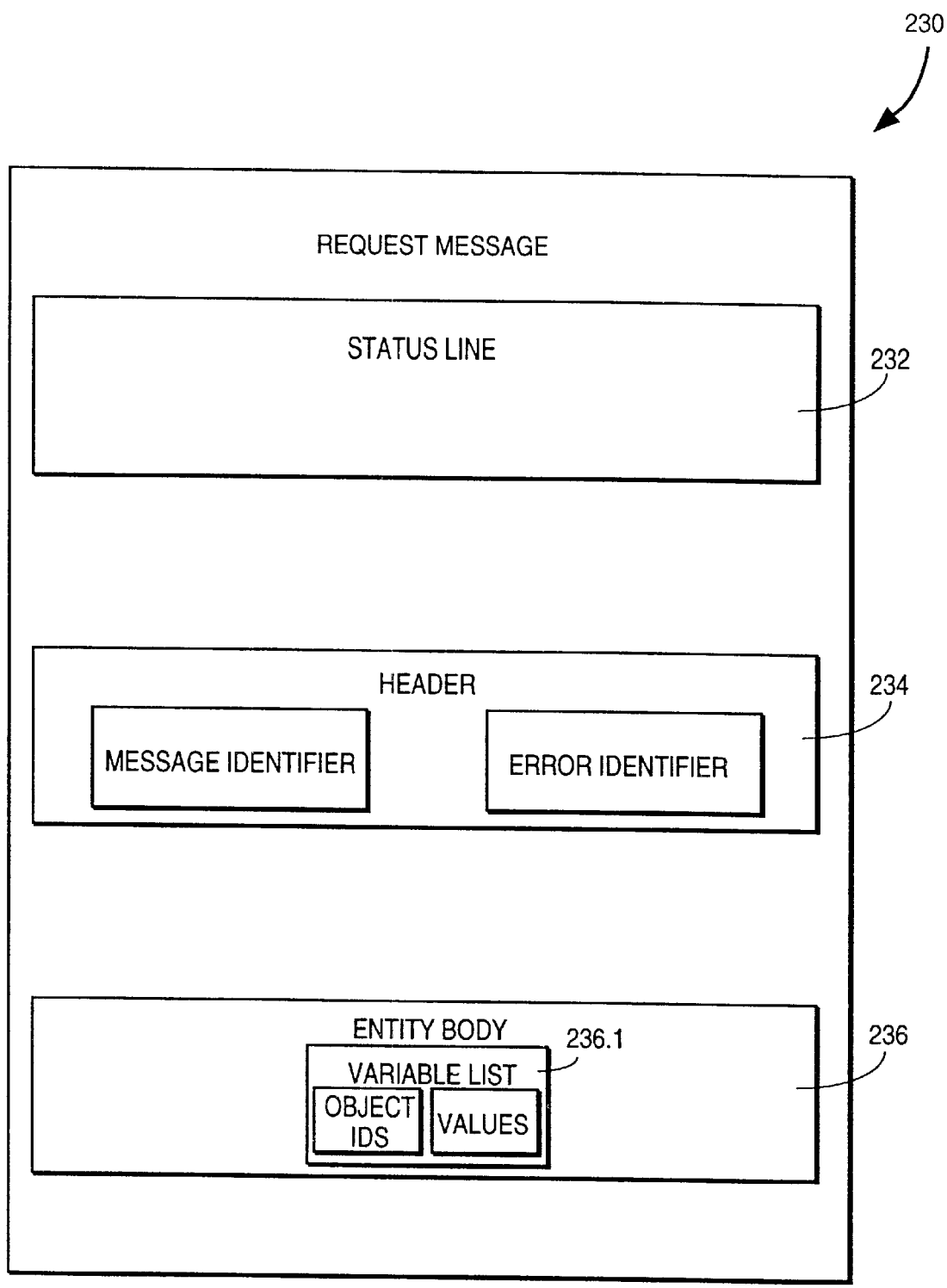
FIG. 17 is a diagrammatic representation of a response message structure according to the present invention.

Referring now to FIG. 17, there is shown a diagrammatic representation of a response message 230. The response message 230 includes a status line 232, a header 234 and an entity body 236. As shown, the header 234 may include both a message identifier and an error identifier. The entity body 236 includes a variable list field 236.1, as detailed above. In a response message sent from an agent 30 in response to a request message incorporating a GET method token, the variable list field 236.1 will incorporate at least one object identifier and an associated value.

In conclusion, the protocol for performing a network management transaction and the web-capable network management agent of the present invention are particularly advantageous in that they provide a mechanism whereby network management can be performed over an internet or an intranet using a web browser. The protocol proposed by the present invention is advantageous in that it addresses the inadequacies of the HTTP protocol with respect facilitating network management by allowing the retrieval and manipulation of multiple managed objects utilizing a single request message. Furthermore, the protocol proposed by the present invention allows a continuous and dedicated TCP/IP connection to be established between a client and a network management agent 19, thus allowing a network manager, utilizing a browser, continually to monitor various aspects of a network device. As the HNMP protocol furthermore utilizes the TCP/IP transport protocol, it is more robust and reliable than the SNMP protocol, which uses the UDP transport layer protocol.

The network management agent 30 of the present invention is furthermore advantageous in that it communicates with a client in a language understood by the client, (for example HTML) and accordingly obviates the need for a proxy agent. The network management agent 30 allows a client to directly and effectively access network management functions provided by the agent.

Thus, a method of performing a network management transaction using a web-capable agent has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of performing a network management function, the method including:
   communicating a markup language document to a client application, the markup language document including a plurality of Uniform Resource Identifiers, each including a method token specifying a network management function; and
   receiving from the client application, responsive to a user-selection of at least one Uniform Resource Identifier, a request to perform the network management function specified by the method token with respect to each managed object identified by a selected Uniform Resource Identifier.

2. The method of claim 1 wherein the method token specifies a retrieval network management function with respect to a managed object.

3. The method of claim 2 wherein the retrieval network management function comprises retrieving at least a first value from the managed object.

4. The method of claim 3 wherein the request includes a request line specifying the retrieval network management function and a body identifying the managed object and a parameter from which to retrieve the at least first value.

5. The method of claim 1 wherein the method token specifies an allocation network management function with respect to a managed object.

6. The method of claim 5 wherein the allocation network management function allocates at least a first value to the managed object.

7. The method of claim 6 wherein the request includes a request line specifying the allocation network management function and a body identifying the managed object and the at least first value.

8. The method of claim 1 wherein the method token specifies a trap set management function with respect to a managed object.

9. The method of claim 1 wherein a parser initializes a URI block with values contained in the request to perform the network management function.

10. The method of claim 1 wherein the method token specifies multiple network management functions to be performed with respect to multiple managed objects.

11. The method of claim 1 wherein the request is to perform the network management function with respect to a Managed Information Base object.

12. The method of claim 1 wherein the markup language document comprises a HyperText Markup Language document.

13. The method of claim 1 wherein the client is a browser application.

14. The method of claim 1 including establishing a connection, via a communications network between a network management agent and the client application, and maintaining the connection for multiple network management transaction between the network management agent and the client application.

15. A system comprising:

a response entity to communicate a markup language document to a client application via a communications network, the markup language document including a plurality of Uniform Resource Identifiers, each including a method token specifying a network management function; and a request entity to receive from the client application via the communications network and responsive to a user-selection of at least one Uniform Resource Identifier, a request to perform the network management function specified by the method token with respect to each managed object identified by a selected Uniform Resource Identifier.

16. The system of claim 15 wherein the method token specifies the network management function to be performed to respect to a managed object.

17. The system of claim 16 wherein the managed object is a Managed Information Base (MIB) object.

18. A system comprising:

first means for communicating, via communications means, a markup language document from a network management means to a client, the markup language document including a plurality of Uniform Resource Identifiers, each including a method token specifying a network management function; and second means for receiving, from the client via the communications means and responsive to a user-selection of at least one Uniform Resource Identifier, a request to perform the network management function specified by the method token with respect to each managed object identified by a selected Uniform Resource Identifier.

19. A machine-readable medium having stored a sequence of instructions that, when executed by the machine, cause the machine to:

communicate via a communications network a markup language document to a client application, the markup language document including a plurality of Uniform Resource Identifiers, each including a method token specifying a network management function; and receive, from the client application via the communications network and responsive to a user-selection of at least one Uniform Resource Identifier, a request to perform the network management function specified by the method token with respect to each managed object identified by a selected Uniform Resource Identifier.

20. A method comprising:

communicating a markup language document to a client application, the markup language document including at least one Uniform Resource Identifier including a method token specifying a protocol; and receiving from the client application, responsive to a user-selection of the at least one Uniform Resource Identifier, a request to perform a network management function using the protocol specified by the method token with respect to each managed object identified by a selected Uniform Resource Identifier.

* * * * *

UNITED STATES PATENT AND TRADEMARK OFFICE
CERTIFICATE OF CORRECTION

PATENT NO. : 6,393,475 B1
DATED : May 21, 2002
INVENTOR(S) : Leong et al.

It is certified that error appears in the above-identified patent and that said Letters Patent is hereby corrected as shown below:

<u>Title page,</u>
Item [74], *Attorney, Agent, or Firm*, please delete "Safman" and insert -- Zafman --.

Signed and Sealed this

Twenty-ninth Day of June, 2004

JON W. DUDAS
*Acting Director of the United States Patent and Trademark Office*